(12) United States Patent
Tsirkin et al.

(10) Patent No.: US 12,527,869 B2
(45) Date of Patent: Jan. 20, 2026

(54) STABLE MICROSPHERES, METHOD OFF ABRICATION AND USE THEREOF

(71) Applicant: B. G. NEGEV TECHNOLOGIES AND APPLICATIONS LTD., AT BEN-GURION UNIVERSITY, Beer Sheva (IL)

(72) Inventors: Shani Tsirkin, Beer Sheva (IL); Joseph Kost, Omer (IL); Tamar Traitel, Beer Sheva (IL); Riki Goldbart, Lehavim (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 1109 days.

(21) Appl. No.: 17/417,230

(22) PCT Filed: Dec. 23, 2019

(86) PCT No.: PCT/IB2019/061279
§ 371 (c)(1),
(2) Date: Jun. 22, 2021

(87) PCT Pub. No.: WO2020/136550
PCT Pub. Date: Jul. 2, 2020

(65) Prior Publication Data
US 2022/0072130 A1    Mar. 10, 2022

Related U.S. Application Data

(60) Provisional application No. 62/784,477, filed on Dec. 23, 2018.

(51) Int. Cl.
*A61K 41/00* (2020.01)
*A61K 9/50* (2006.01)
*A61K 33/16* (2006.01)

(52) U.S. Cl.
CPC ........ *A61K 41/0047* (2013.01); *A61K 9/5031* (2013.01); *A61K 33/16* (2013.01); *A61K 41/0028* (2013.01)

(58) Field of Classification Search
CPC ................................................. A61K 41/0047
See application file for complete search history.

(56) References Cited

U.S. PATENT DOCUMENTS

2013/0281916 A1   10/2013   Wagstaffe et al.
2017/0224849 A1*   8/2017   Carroll ................ A61K 49/048

FOREIGN PATENT DOCUMENTS

KR    20180130344 A    12/2018
WO    2007127813 A2    11/2007

OTHER PUBLICATIONS

Cui, W et al., Preparation and evaluation of poly(L-lactide-co-glycolide) (PLGA) microbubbles as a contrast agent for myocardial contrast echocardiography, Jan. 27, 2005, J Biomedical Materials Research, vol. 73B, 171-178 (Year: 2005).*
Cui, W. et al., Preparation and evaluation of poly(L-lactide-co-glycolide) microbubbles as a contrast agent for myocardial contrast echocardiography, Jan. 27, 2005, Journal of Biomedical Materials Research Part B: Applied Biomaterials, vol. 73B, 171-178 (Year: 2005).*
Cosco, D. et al., Perfluorocarbon-loaded micro and nanosystems for medical imaging: A state of the art, Oct. 24, 2014, Journal of Fluorine Chemistry, vol. 171, 18-26 (Year: 2014).*
Harmark, J. et al., Shell thickness determination of polymer-shelled microbubbles using transmission electron microscopy, Apr. 1, 2016, Micron, vol. 85, 39-43 (Year: 2016).*
Xu, R.X. et al., Fabrication of indocyanine green encapsulated biodegradable microbubbles for structural and functional imaging of cancer, Journal of Biomedical Optics, 2009, vol. 14, 034020 (Year: 2009).*
El-Sherif, D.M. et al., Development of a novel method for synthesis of a polymeric ultrasound contrast agent, Journal of Biomedical Materials Research Part A, 2003, vol. 66A, 347-355 (Year: 2003).*
Cui W., et al., "Preparation and Evaluation of Poly (L-Lactide-Co-Glycolide) (PLGA) Microbubbles as a Contrast Agent for Myocardial Contrast Echocardiography", Journal of Biomedical Materials Research Part B: Applied Biomaterials, vol. 73B, pp. 171-178 (2005).
International Search Report and Written Opinion of Application No. PCT/IB2019/061279 mailed May 12, 2020, 9 Pages.
El-Sherif et al., "Development of a Novel Method for Synthesis of a Polymeric Ultrasound Contrast Agent", Journal of Biomedical Materials Research, Aug. 2003, vol. 66A(2,1), pp. 347-355, XP055098302, DOI: 10.1002/jbm.a.10586.
European Patent Application No. 19902732.7, Extended European Search Report dated Aug. 17, 2022, 7 pages.
International Preliminary Report on Patentability for Application No. PCT/IB2019/061279, mailed on Jun. 16, 2021, 8 pages.

* cited by examiner

*Primary Examiner* — Bethany P Barham
*Assistant Examiner* — Paul Hoerner
(74) *Attorney, Agent, or Firm* — FISHERBROYLES, LLP; Roger L. Browdy

(57) ABSTRACT

Stable and durable polymeric microbubbles of a 1-10 μm size range are disclosed. The microbubbles are synthesized from the co-polymer poly lactic-co-glycolic acid (PLGA), which provides a plurality of PLGA microbubbles presenting diverse cavitation activities. The PLGA microbubbles are particularly suitable for cavitation enhancement purposes and are applicable in various clinical procedures such as ablation or enhancement of uptake of chemical or biological therapy in cells and tissue.

21 Claims, 11 Drawing Sheets

SEM　　　　　　　　　　　Confocal

Confocal

Confocal

Fig. 14A
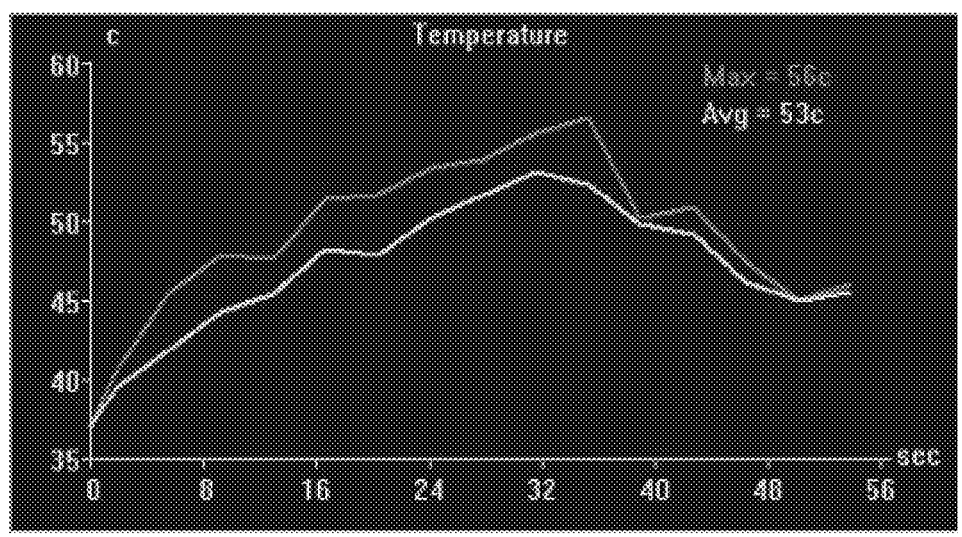
Fig. 14B
Fig. 14C
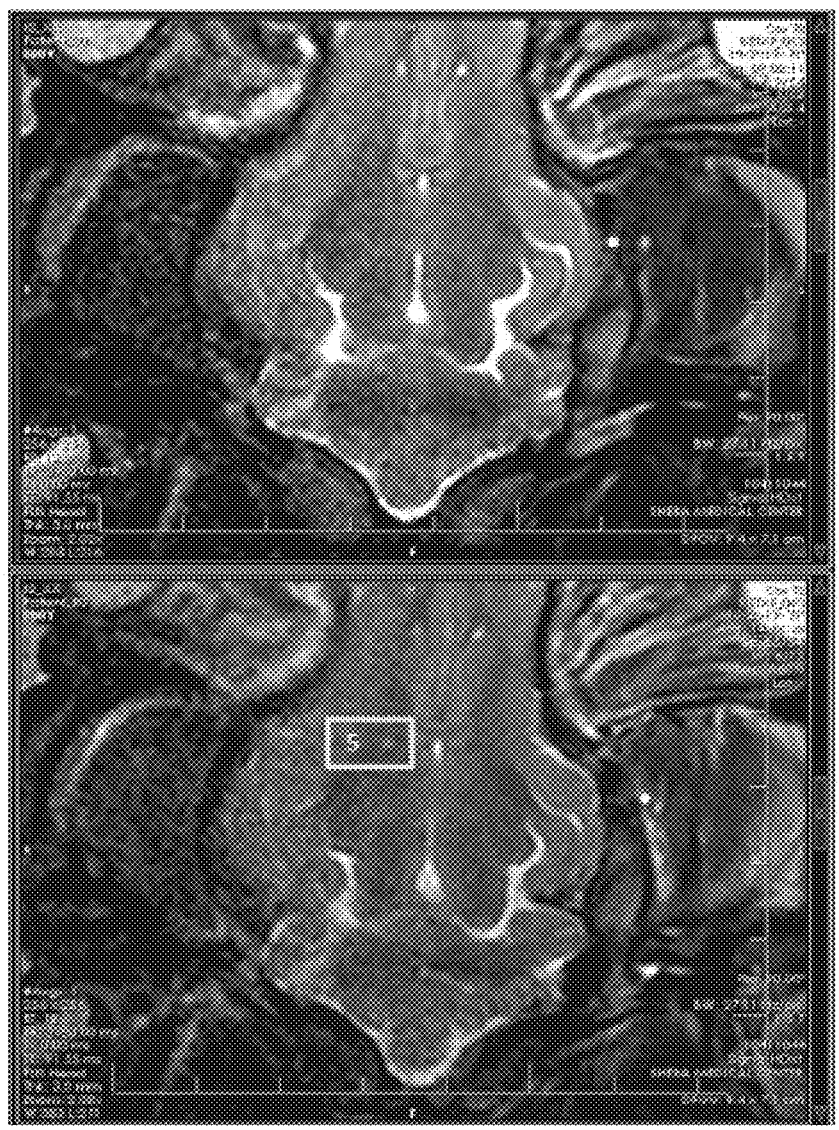

STABLE MICROSPHERES, METHOD OFF ABRICATION AND USE THEREOF

FIELD OF THE INVENTION

The present disclosure relates to polymeric microbubbles and use thereof, more specifically, but not exclusively, to poly(L-lactide-co-glycolide) (PLGA) microbubbles fabricated for production of acoustic cavitation and use thereof in cavitation related phenomena.

BACKGROUND

The formation of vapor cavities (small liquid-free zones; "bubbles" or "voids" in a liquid) is known as cavitation. Cavitation usually occurs when a liquid is subjected to rapid changes of pressure that cause the formation of cavities in the liquid where the pressure is relatively low. Acoustic cavitation is the formation of gas bubbles, and activity (growth, oscillations or collapse) of existing gas bubbles in a medium exposed to ultrasound. In this process, mechanical effects such as microstreaming, microjets, and shock waves can be produced.

There are two types of acoustic cavitation: stable and inertial (or transient). Stable cavitation is prolonged oscillations, e.g., in size or shape (for a considerable number of cycles) of gas bubbles in response to pressure changes, for example, a changing acoustic filed, when the intensity of the acoustic field is insufficient to cause total bubble collapse. The bubbles expand during the rarefaction phase and contract during the compression phase. The stable oscillations create a liquid flow around the bubble, known as microstreaming that induces shear stresses. If the bubbles are located near biological tissue these shear stresses can cause pore formation and affect cell permeability.

Inertial cavitation occurs in a higher pressure amplitude (higher acoustic intensity), when the pressure amplitude is sufficiently high and reaches a critical value (inertial cavitation threshold). The bubble grows and collapses violently; during the collapse, symmetrical shockwaves with high pressure (exceeding 10 Kbar) can be generated. When the bubbles are close to a solid surface, the collapse is asymmetrical, and a liquid jet will be created. When the collapse occurs near biological tissue it can cause membrane perforation, reversible pore formation and blood vessel permeabilization. Inertial cavitation is used in various man-made devices, such as tools for destroying gall stones and local targeted eradication of cancer cells.

Cavitation effects may be applied to achieve positive outcomes, for example, facilitating acoustic cavitation phenomena near biological tissues may be used to cause limited and controlled damage to the surface of various body tissues to the extent that they become permeable to various chemicals and, thus, can lead to several therapeutically beneficial effects, such as temporary opening of the blood-brain barrier, increased permeability of different biological membranes, and cells or tissue ablation.

Natural gas bubbles that are normally present in a liquid, have a very short half-life. Synthetic, biocompatible microbubbles (MBs) made of gas encapsulated inside a solid shell, for example, microbubbles comprising a gas such as air, sulfur hexafluouride, perfluorobutane or perfluoropropane entrapped within a polymer, lipid or protein shell, are known. Synthetic microbubbles afford longer lifetimes compared to natural gas bubbles and may be introduced into liquids. Biologically compatible cavitating microbubbles are known for use in therapeutic applications, such as drug delivery across the blood-brain divide, or for transporting active agents across cell membranes. However, mostly, such microbubbles have been found to be unsuitable either for being fragile, tending to disintegrate in vivo before they exert their beneficial effect, or the acoustic cavitation they produce is too powerful and may cause more damage to body tissues than required for drug penetration or other specific uses.

There is yet an unmet need for safe, durable, long lasting biocompatible microbubbles that provide an effective and controllable cavitation, e.g., in therapeutic applications, yet are compatible and safe for use.

SUMMARY

The use of synthetic microbubbles in combination with ultrasound has been investigated extensively for various medical applications, such as targeted treatment of tumors and blood-brain barrier (BBB) opening, by enhancement of acoustic cavitation, mostly using commercial, synthetic microbubbles that have been developed for imaging purposes. However, microbubbles of this kind are not necessarily optimized for cavitation enhancement, mainly because they have a limited half-life that may not be long enough to perform a prolong therapeutic treatment, thus, e.g., requiring repeated injections of the microbubbles into the bloodstream. In addition, sometimes these bubbles have an adverse activity expending beyond the treatment area, causing bleeding and hemorrhage in healthy tissues. Moreover, it is noted that different treatments require different cavitation activities. For example, the cavitation dose required to open the BBB is different from that required for ablation. Therefore, it is advantageous to develop microbubbles adapted to the specific treatment. It is further advantageous to develop microbubbles that would not be toxic in a biological system such as the human body, even when administered in relatively high concentrations.

The present disclosure relates to stable and durable polymeric microbubbles at a size range of 1-10 μm with enhanced acoustic cavitation. Microbubbles disclosed herein are synthesized from the co-polymer poly lactic-coglycolic acid (PLGA), which provided fabricated microbubbles having different properties accounting for diverse cavitation activities. PLGA microbubbles, particularly suitable for cavitation enhancement purposes are disclosed herein for the first time.

In one aspect, the present disclosure relates to a plurality of microbubbles comprising a polymeric shell encapsulating a gas, wherein at least a portion of the microbubbles are single-core microbubbles of 10 μm diameter or less, comprising non-porous PLGA shell of a predetermined lactic acid:glycolic acid molar ratio, the plurality of microbubbles are produced by a double emulsion solvent evaporation method comprising the steps of:
  (i) preparing an organic phase (O) by dissolving or dispersing an amount of from about 10 mg/ml to about 100 mg/ml PLGA in an organic solvent, for example, ethyl acetate;
  (ii) preparing a first aqueous phase ($W_1$) by dissolving or dispersing a first surfactant in an amount in a range of from about 0.1% w/v to about 15.0% w/v in water (e.g., deionized water);
  (iii) preparing a second aqueous phase ($W_2$) by dissolving or dispersing a second surfactant in an amount in a range of from about 2% w/v to about 15% w/v in water (e.g., deionized water);

(iv) combining the organic phase and the first aqueous phase under emulsification conditions to obtain a first microemulsion $W_1/O$, having a $W_1:O$ volume ratio in the range of from about 0.5:10.0 to about 5.0:10.0;

(v) combining a portion of the first microemulsion $W_1/O$ with the second aqueous phase under emulsification conditions, for example, under vortex conditions, to obtain a second microemulsion $W_1/O/W_2$;

(vi) evaporating the organic solvent; and (vii) harvesting the microbubbles, washing and, optionally, subjecting them to lyophilization.

Microbubbles thus obtained have a PLGA shell thickness of from about 100 nm to about 800 nm.

The first and the second surfactants may be the same surfactant provided in the same concentration and same molecular weight, or the same surfactant may be provided to both $W_1$ and $W_2$, but not in the same concentrations and/or not the same molecular weights. Alternatively, the first and the second surfactants may be different. In some embodiments, at least one of the first surfactant or the second surfactant is selected from partially hydrolyzed polyvinyl alcohol (PVA), Span, Tween, sodium dodecyl sulphate (SDS), cetyltrimethyl ammonium bromide (CTAB), Pluronic F68, Poloxamer 188 and 311, PEG, Triton x-100 or any combination thereof.

In some embodiments, at least one of the first surfactant or second surfactant is partially hydrolyzed PVA. In some embodiments, both the first surfactant and second surfactant are partially hydrolyzed PVA (herein termed "PVA"). The PVA may be of the same molecular weight (Mw) and/or concentration in both $W_1$ and $W_2$, or PVA in $W_1$ may differ from PVA in $W_2$ in concentration and/or Mw.

When partially hydrolyzed PVA is used as microemulsion stabilizer, a plurality of PLGA-shelled microbubbles may be prepared, by a double emulsion process comprising the steps of:

(i) preparing an organic phase (O) by dissolving or dispersing PLGA co-polymer having a predetermined lactic acid:glycolic acid ratio in an organic solvent, for example, ethyl acetate;

(ii) preparing a first aqueous phase ($W_1$) by dissolving or dispersing PVA in an amount in a range of from about 0.1% w/v to about 15.0% w/v in water (e.g., deionized water);

(iii) preparing a second aqueous phase ($W_2$) by dissolving or dispersing PVA in an amount in a range of from about 0.5% w/v to about 15.0% w/v in water (e.g., deionized water);

(iv) combining the organic phase and the first aqueous phase under emulsification conditions to obtain a first microemulsion $W_1/O$, having a $W_1:O$ volume ratio of from about 0.5:10.0 to about 5.0:10.0;

(v) combining a portion of the first microemulsion $W_1/O$ with the second aqueous phase under vortex conditions to obtain a second microemulsion $W_1/O/W_2$;

(vi) evaporating the organic solvent; and (vii) harvesting the microbubbles, washing and, optionally, subjecting them to lyophilization.

Microbubbles disclosed herein are synthesized using a modified double emulsion solvent evaporation process, which has been adjusted and optimized so as to produce synthetic microbubbles having desired size, mechanical properties, morphology, inner structure and cavitation activity. The disclosed microbubbles present different properties such as different cavitation thresholds and different cavitation doses.

The microbubbles' core structure is determined, in accordance with the present disclosure, by at least one of $W_1:O$ volume ratio, surfactant concentration in $W_1$, surfactant's hydrophobicity, or surfactant's the molecular weight.

For example, when the $W_1:O$ volume ratio is in a range of from about 1:20 to about 1:5, e.g., 1:18, 1:15, 1:12, 1:10, 1:7, 1:6 or 1:5, at least a portion of the microbubbles are multi-core microbubbles. However, when the $W_1:O$ volume ratio is from about 1:4.8 to about 1:2.0, e.g., 1:4.5, 1:4.3, 1:4.0, 1:3.5, 1:3.3, 1:3.0, 1:2.8, 1:2.5, 1:2.3 or 1:2.0, at least a portion of the microbubbles are single-core microbubbles.

The molecular weight (Mw) of the PVA employed in a disclosed process may be in a range of from about 10 KDa to about 200 kDa. In some embodiments, the PVA used is a low Mw PVA of from about 28 KDa to about 55 kDa. In some embodiments, the PVA used is a high Mw PVA of or from about 80 KDa to about 130 kDa.

The amount of PVA in $W_1$ may be in a range, for example, of from about 0.5% w/v to about 6.0% w/v. The amount of PVA in $W_2$ may be in a range, for example, of from about 2.5% w/v to about 10.0% w/v.

The PLGA employed in a disclosed process may have a predetermined lactic acid:glycolic acid molar ratio from 0:100 to 100:0. In some embodiments, the lactic acid: glycolic acid molar ratio is 50:50.

The cavitating microbubbles disclosed herein may encapsulate a gas such as air, sulfur hexafluoride ($SF_6$), perfluoropropane ($C_3F_8$) or perfluorobutane ($C_4F_{10}$). In some embodiments, the gas is $C_3F_8$.

The acoustic cavitation produced by the contemplated microbubbles is determined by at least one of microbubbles structure, microbubbles production process parameters, type of gas entrapped, or acoustic pressure applied, and may be an inertial cavitation or a stable cavitation.

Microbubbles disclosed herein are useful for medical treatment and may be injected to the blood stream, lymph, a tissue and/or an organ. As such, the disclosed microbubbles are characterized by at least the following properties: (i) they are composed of biocompatible and biodegradable material; (ii) they are small enough to pass through the capillaries of the lungs that allow passage of particles with a diameter of up to 10 microns; and (iii) their circulation time in the blood stream may be long enough to avoid repeated injections during the treatment.

Thus, in further aspects, the present disclosure relates to therapeutic methods applicable for at least one of: (i) increasing permeability of a membrane, a tissue or a biological barrier in a tissue or a portion thereof so as to enable or enhance, e.g., entry of biologically active compounds (e.g., drugs) into diseased tissues/organs, and/or exit or disposal hazardous compounds form healthy or diseased tissues/organs; or (ii) ablation or destruction of a tissue or a part thereof, in a subject in need thereof. These methods generally comprise the steps of:

(a) administering to the subject an effective amount (e.g., a therapeutically effective amount) of a plurality of microbubbles as defined herein; and (b) stimulating the microbubbles in a predetermined desired region in the subject's tissue or organ by the application of a local acoustic pressure to create a localized acoustic cavitation, thereby treating the subject.

The biological barrier may be an inter-tissue barrier such as blood-brain barrier, blood-retinal barrier or blood-testis barrier, and the tissue may be skin.

Thus, contemplated microbubbles may find clinical use in at least one of: (i) treatment of vascular thrombosis; (ii)

ablation of cancerous or non-cancerous solid tumor; (iii) enhancement of transdermal drug delivery; (iv) enhancement of uptake of chemical or biological therapy in cells and tissue; or (iv) destruction of adipocytes.

In yet a further aspect, the present disclosure relates to a pharmaceutical composition comprising a pharmaceutically acceptable excipient, and a plurality of microbubbles as defined herein.

In still a further aspect, the present disclosure relates to a kit comprising (a) a plurality of microbubbles as defined herein, or a formulation comprising same; (b) means to administer the microbubbles to a subject in need thereof; and, optionally (c) written instructions.

BRIEF DESCRIPTION OF THE FIGURES

Some embodiments of the present disclosure are herein described, by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments of the disclosure may be practiced.

In the drawings:

FIGS. 14A-14C present the results of MRgFUS ablation procedure performed in the brain of a female pig following continuous infusion of microbubbles filled with $C_3F_8$ gas. FIG. 14A is a graph showing the temperature profile measured in the animal's brain during the sonication procedure; FIGS. 14B and 14C are T2 weighted MRI images of the pig's brain as obtained before and after ablation, respectively. The thermal effect is marked by the rectangle.

DETAILED DESCRIPTION

Figure 1:
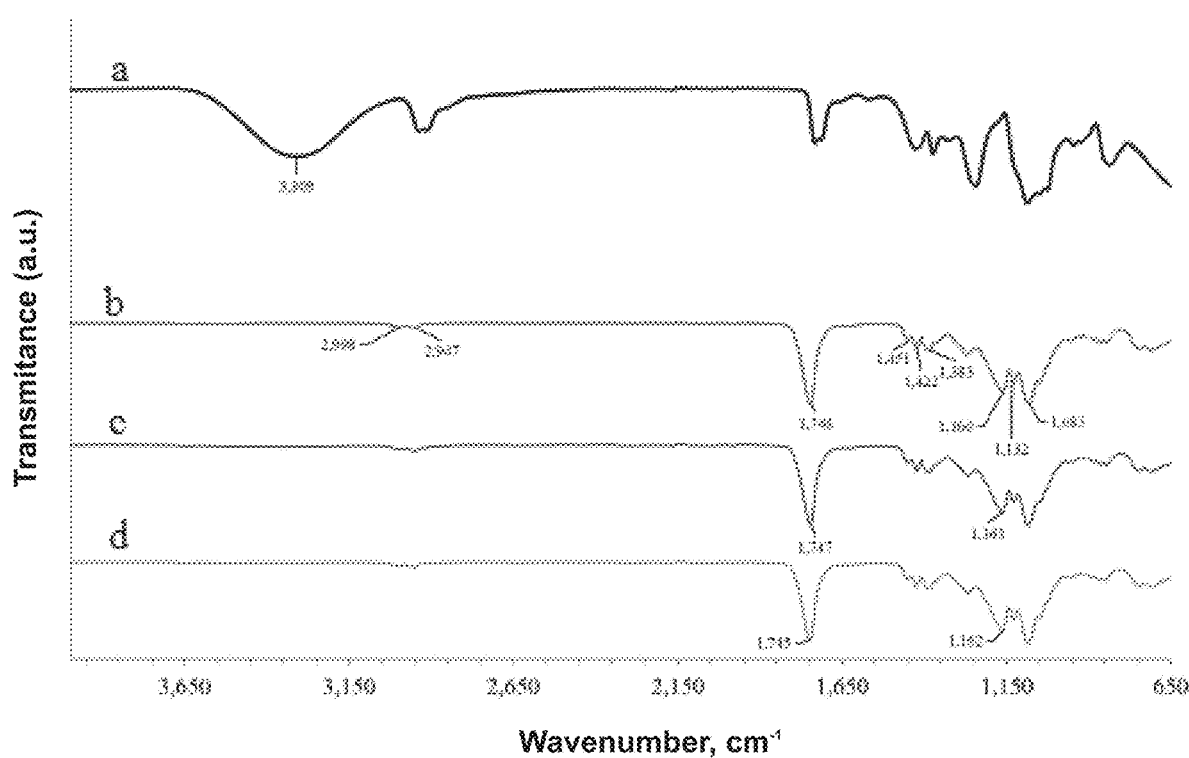
FIG. 1 is a FTIR spectra of high molecular weight (Mw) polyvinyl alcohol (PVA) (a), PLGA (b), microbubbles with PLGA shell synthesized with 5% high Mw PVA aqueous solution as both external and inner phases (c), and microbubbles with PLGA shell synthesized with 5% high Mw PVA aqueous solution as external phase and water as inner phase (d)

The present disclosure relates to stable and durable polymeric microbubbles and use thereof in cavitation-related phenomena, more specifically, but not exclusively, to thin-shell poly(L-lactide-co-glycolide) (PLGA) microbubbles fabricated in a size of 1-10 μm, for production of controlled acoustic cavitation which finds use in therapeutic applications. The microbubbles described herein are fairly stable microspheres that can be dispersed in a liquid, such as blood or lymph, in known concentrations.

The present disclosure is based on the discovery by the present inventors that cavitating microbubbles composed of a solid shell of PLGA and a gas core can be successfully synthesized using a modified double emulsion solvent evaporation method. In vitro and in vivo acoustic activity tests conducted by the present inventors have shown that these PLGA microbubbles had the ability to produce impressive amounts of cavitation doses, which were applicable, e.g., in a successful enhancement of BBB permeability.

The present inventors have envisaged that certain properties and qualities of the synthetic microbubbles such as their inner morphology, size distribution, stability and/or cavitation activity can be determined and controlled by certain modifications of the known double emulsion solvent evaporation methods. The present disclosure is, thus, further based on the discovery by the present inventors that cavitating microbubbles featuring desired physical and chemical properties may successfully be obtained by the addition of a stabilizer such as a surfactant to the inner aqueous phase in the process of making the first microemulsion in the double emulsion solvent evaporation method. Such a substantial modification of the known synthesis process has resulted in the acquisition of stable microbubbles with a single core and shell structure that are particularly suitable for acoustic cavitation applications.

The Examples disclosed herein describe further manipulations and modifications of the known synthesis method that dramatically affected the structure and, hence, the properties and cavitation activity of the fabricated microbubbles. For example, the internal structure of the microbubbles can be controlled by changing the volume ratio between the internal aqueous solution comprising a surfactant such as a partially hydrolyzed polyvinyl alcohol (PVA), and the organic phase comprising the shell-forming polymer. For low ratios, for example a ratio of 1:20 surfactant inner solution:organic phase resulted in a multi-core structure, while increasing this ratio, e.g., to 1:5 or 3:10 led to microbubbles featuring a structure of a single core and shell, also termed herein "hollow microbubbles". The microbubbles' inner structure affects their cavitation activity, for example, single core and shell microbubbles produce a much higher cavitation dose than multi-core microbubbles under identical sonication conditions. Also, the microbubbles size distribution can be controlled by changing the surfactant (e.g., the emulsifier PVA) concentration in the external aqueous phase used for making the second microemulsion in the double emulsion solvent evaporation method. An increase of emulsifier concentration led to better stabilization and reduced microbubbles coalescence, resulting in narrower microbubbles' size distribution.

In one aspect, the present disclosure relates to a plurality of microbubbles comprising a polymeric shell encapsulating a gas, wherein at least a portion of the microbubbles are single-core microbubbles (hollow microbubbles) of 10 μm diameter or less, comprising poly-lactic-co-glycolic acid copolymer (PLGA) shell of a predetermined lactic acid (LA):glycolic acid (GA) molar ratio. These microbubbles are produced by a double emulsion solvent evaporation method comprising at least the following steps:

(i) obtaining an organic phase (O) comprising the PLGA copolymer in an amount of from about 10 mg/ml to about 100 mg/ml, and an organic solvent;
(ii) obtaining a first aqueous phase ($W_1$) comprising a first surfactant in an amount in a range of from about 0.1% w/v to about 15.0% w/v;
(iii) obtaining a second aqueous phase ($W_2$) comprising a second surfactant in an amount in a range of from about 2% w/v to about 15% w/v;
(iv) combining the organic phase and the first aqueous phase under emulsification conditions to obtain a first microemulsion $W_1/O$, having a $W_1:O$ volume ratio in a range of from about 0.5:10.0 to about 5.0:10.0;
(v) combing a portion of the first microemulsion $W_1/O$ with the second aqueous phase under emulsification conditions such as vortex or homogenization, to obtain a second microemulsion $W_1/O/W_2$;
(vi) discarding, e.g., evaporating, the organic solvent; and
(vii) harvesting the microbubbles, washing and, optionally, lyophilizing them.

For at least a portion of the microbubbles disclosed herein, the polymeric shell is non-porous and/or the shell thickness is from about 100 nm to about 800 nm.

The term "microbubbles" is exchangeable herein with "synthetic microbubbles" (MBs), and refers to synthetically fabricated microspheres, made of gas or low boiling point liquid encapsulated inside a solid shell. Such synthetic microbubbles are also referred to herein as "cavitation nuclei" since they can initiate and/or enhance acoustic cavitation in a liquid medium. Microbubbles, herein, are to be distinguished from the naturally occurring gas bubbles in a liquid medium, which are herein referred to simply as "gas bubbles". Unlike gas bubbles which dissolve in a liquid medium such as blood or water nearly instantaneously due to lack of encapsulation, the solid shell of the synthetic microbubbles increases their life time in a liquid.

Synthetic microbubbles, in general, differ in their core and shell type. The microbubbles' solid shell decelerates gas diffusion and dissolution and improves the microbubbles life span. The shell of synthetic microbubbles can be divided into two categories: soft shell (lipids and surfactants) and hard shell. The most common hard-shell materials are polymers or proteins. The interactions between the molecules are covalent bonding and/or chains entanglement which give the hard-shell microbubbles their rigidity. Polymeric shells are composed of cross-linked or entangled polymer chains. The polymers may be natural polymers such as polysaccharides or synthetic polymers such as, but not limited to, cyanoacrylate, polyvinyl alcohol and PLGA. The main disadvantage of using natural polymers is the low reproducibility regarding microbubbles size. Furthermore, natural polymers such as polysaccharides proved to be not useful for stabilizing microbubbles.

Soft shell synthetic microbubbles are more sensitive to pressure variations and are less stable than hard shell synthetic microbubbles due to the nature of interactions of the shell-forming molecules, i.e., non-covalent interactions. Also, polymeric microbubbles behave differently from lipid microbubbles in exposure to ultrasound waves. At low-intensity, lipid microbubbles will oscillate and create stable cavitation, but at higher intensities, the microbubbles will collapse or split into several small microbubbles. In contrast, polymeric microbubbles will not oscillate at low intensities. Above certain intensity, they will crack and release part of the gas content, and at higher intensities, they will break down completely.

It is noted that microbubbles for clinical use were initially designed for imaging purposes only and served as contact agents. For example, PLGA microbubbles attempted for use in ultrasound applications as described, for example, by Cui et al. (Journal of Biomedical Materials Research Part B: Applied Biomaterials 73:171-178, 2005), served as a contrast agent for myocardial contrast echocardiography. As contrast agents, these PLGA microbubbles have physical and mechanical properties that distinguish them from the PLGA microbubbles disclosed herein, which are uniquely designed for producing controllable acoustic cavitation.

The term "emulsion", as used herein, refers to a mixture of two or more liquids that would not normally mix, namely, a mixture of two or more immiscible liquids such as water and an organic solvent. By definition, an emulsion contains tiny particles of one liquid suspended in another. Emulsions may be milky in appearance and the suspended material may be colloidal in nature. A classic example of an emulsion is oil and water when mixed under vigorous stirring. However, when the agitation stops, the two liquids separate, and the emulsion breaks down. Although kinetically stable, from a thermodynamic point of view, an emulsion is an unstable system, since there is a natural tendency for a liquid-liquid system to separate and reduce its interfacial energy. Thermodynamically unstable emulsions are also referred to herein as "macroemulsions".

Stable emulsions can be formed from two immiscible liquids when an emulsifier is added to at least one of the immiscible liquids. Such emulsions do not separate out after a change in conditions like temperature or over time. Thermodynamically stable emulsions are referred to herein as "microemulsions". Microemulsions, therefore, are thermodynamically stable dispersions of two or more immiscible liquids and at least one emulsifier.

Microemulsions differ significantly from conventional emulsions by physical properties such as transparency, low viscosity, particle size, and the like, and by their ability to form spontaneously. The low energy input involved in the preparation of a microemulsion due to its spontaneous formation and physical stability makes microemulsions advantageous over emulsions. Microemulsions embrace several different microstructures that have little in common with conventional emulsions. While a microemulsion is thermodynamically stable, emulsion droplets, which may be as small as those of microemulsion, will undergo coalescence, leading to phase separation. A markedly stable ultrafine emulsion (i.e., thermodynamically unstable) with a long shelf-life can be obtained with optimized compositions and manufacturing processes. Accordingly, such emulsions can be considered pseudo-equivalent to microemulsions in a broad sense and could be applied in the same manner.

Non-limiting examples of oil or an organic solvent and water microemulsions include oil-in-water microemulsion (i.e., droplets of oil suspended or dispersed in an aqueous phase), designated herein "O/W"; water-in-oil microemulsion (i.e., droplets of water dispersed or suspended in an oily phase), designated herein "W/O"; oil-in-water-in-oil microemulsion (O/W/O) and water-in-oil-in-water microemulsion (W/O/W). In the context of embodiments described herein, the term "oil" is to be interpreted in a broad way so as to include organic liquids which are not necessarily oily, for example, ethyl acetate, or dichloromethane. Homogeneous microemulsion systems contemplated herein can be prepared over a wide range of surfactant concentrations and oil-to-water ratios.

The term "emulsification conditions", as used herein, refers to actions and/or means that are used in the process of making a microemulsion, such as, but not limited to, homogenization, vortex mixing, sonication and ultrasonication.

A vortex is a mass of fluid (such as a liquid) with a whirling or circular motion that tends to form a cavity or vacuum in the center of the circle and to draw toward this cavity or vacuum bodies subject to its action.

Sonication is the act of applying sound energy to agitate particles in a sample. In ultrasonication, ultrasonic frequencies (>20 kHz) are usually used.

Homogenization is a fluid mechanical process that involves the subdivision of particles or droplets into micron sizes to create a stable dispersion or emulsion for further processing.

In some embodiments, emulsification, for example formation of the second microemulsion $W_1/O/W_2$, is obtained under vortex condition. In some embodiments, the first microemulsion $W_1/O$, and or second microemulsion $W_1/O/W_2$, is obtained by sonication or homogenization.

Emulsifiers adsorb at the interface between oil or other organic liquid, and water, thereby decreasing the surface tension. Surfactants are the principal agents that enable oil and water to mix. An emulsifier is a surfactant that stabilizes emulsions. Emulsifiers coat droplets within a microemulsion and prevent them from merging, or coalescing. As used herein, the terms "emulsifier", "surfactant", "microemulsion stabilizer" and "emulsion stabilizer" are interchangeable.

An emulsifier consists of a hydrophobic chain tail and a hydrophilic head. The hydrophilic head is oriented towards the water, and the hydrophobic tail towards the organic/oily phase. The emulsifier positions itself in this orientation at the interface, reduces the surface tension and increases the charge (the zeta potential) on the droplet surface, which results in a stabilizing effect on the emulsion. Additionally, or alternatively, an emulsifier, such as PVA, can stabilize the microemulsion by creating a steric hindrance that supports liquids separation.

Numerous surfactants are known and commercially available. Exemplary surfactants suitable for the purpose of embodiments described herein include, but are not limited to, nonionic surfactants such as Tween and Span, partially hydrolyzed polyvinyl alcohol (PVA), anionic surfactants such as sodium dodecyl sulphate (SDS), cationic surfactants such as cetyltrimethyl ammonium bromide (CTAB), Pluronic F68, Poloxamer 188 and 311, PEG and Triton x-100.

In some embodiments, the first surfactant and the second surfactant are the same.

In some embodiments, the first surfactant and the second surfactant are different.

In some exemplary embodiments, at least one of the first surfactant or second surfactant is PVA.

The amount of first surfactant (emulsifier) in the first aqueous phase ($W_1$) and/or the amount of the second surfactant (emulsifier) in the second aqueous phase ($W_2$) may, independently, be the same or different.

In embodiments described herein, the amount of the first surfactant may be in the range of form about 0.1% w/v to about 15.0% w/v. For example, $W_1$ may comprise a surfactant in an amount which is in the range of form about 0.1% w/v to about 0.5% w/v, form about 0.3% w/v to about 0.8% w/v, form about 0.5% w/v to about 1.5% w/v, form about 1.0% w/v to about 2.5% w/v, form about 1.5% w/v to about 3.0% w/v, form about 2.0% w/v to about 5.0% w/v, form about 4.5% w/v to about 5.5% w/v, form about 5.0% w/v to about 8.0% w/v, form about 6.5% w/v to about 10.0% w/v, form about 8.5% w/v to about 13.0% w/v, or form about 12% w/v to about 15.0% w/v, and any sub-ranges and individual values therebetween.

The amount of the second surfactant, in accordance with embodiments described herein, may be in the range of form about 2.0% w/v to about 15.0% w/v. For example, $W_2$ may comprise a surfactant in an amount which is in the range of form about 2.0% w/v to about 3.0% w/v, form about 2.5% w/v to about 4.5% w/v, form about 3.0% w/v to about 5.0% w/v, form about 4.5% w/v to about 6.5% w/v, form about 5.0% w/v to about 6.0% w/v, form about 6.0% w/v to about 8.0% w/v, form about 4.5% w/v to about 5.5% w/v, form about 5.0% w/v to about 8.5% w/v, form about 8.0% w/v to about 10.0% w/v, form about 8.5% w/v to about 13.0% w/v, or form about 12% w/v to about 15.0% w/v, and any sub-ranges and individual values therebetween.

The amount of either the first or second surfactant, which is suitable for the purpose of obtaining single-core, stable, cavitating PLGA microbubbles, is determined based on the type of surfactant used, for example, based on the molecular weight, hydrophobicity, hydrophobic chain length, electric charge of the polar headgroup and/or elasticity of the surfactant. Also, it is noted that the conditions for obtaining stabilization of the first microemulsion would not necessarily by the same conditions required to stabilize the second microemulsion. Thus, for example, the same surfactant, for example PVA, may be used in different concentrations, different hydrophobicities and/or different molecular weights in the first aqueous phase ($W_1$) and in the second aqueous phase ($W_2$).

For obtaining sufficient phase separation that is necessary for microemulsion formation, the organic solvent dissolving the shell-forming polymer and forming the organic phase (O) is chosen such that it has low water solubility. In addition, an organic solvent of choice should have a low boiling point temperature and high volatility so that its evaporation rate will be relatively high. Finally, since the contemplated microbubbles are intended for medical use, the organic solvent is of low toxicity. Non-limiting examples of organic solvents useful for the purpose of embodiments disclosed herein include dichloromethane (DCM), which has low water solubility (20 g/L) and low boiling point (39.7° C.), and ethyl acetate, which has higher solubility in water (90 g/L). Ethyl acetate also has much lower toxicity than DCM, the latter being known for its carcinogenicity.

The most common material used as a first aqueous phase ($W_1$), also interchangeably referred to herein as "inner phase", in known double emulsion solvent evaporation methods is deionized water. The inner aqueous phase is removed in a freeze-drying process, leaving small cavities that can be filled with a gas such as $C_3F_8$. In order to increase the volume of the internal cavity, deionized water can be replaced by ammonium carbonate solution that is added to a PLGA solution containing camphor. Camphor and ammonium carbonate sublime in a freeze-drying process and leave a void in their place.

The second aqueous phase ($W_2$), also interchangeably referred to herein as "external phase" or "outer phase", contains a stabilizer (emulsifier), whose function is to stabilize the second microemulsion and prevent aggregation and coalescence of emulsion droplets.

There are several known methods for producing microbubbles comprising a PLGA shell (herein also termed "PLGA microbubbles") with gas/liquid core, such as spray drying, phase separation and double emulsion solvent evaporation. The double emulsion solvent evaporation method, shortly referred to herein as the "double emulsion process", is described, for example, in Niu et al., 2013 (Niu et al., *Biomaterials* 34:2307-2317 (2013)), Zhang et al., 2014 (Zhang et al., *Biomaterials* 35:5148-5161 (2014)) and Wang et al., 2015 (Wang et al., *Molecular medicine reports* 11:1885-1890 (2015)). Briefly, PLGA is dissolved in an organic solvent (O), and an aqueous phase, which serve as the inner phase ($W_1$) is added to the organic phase. The mixture is then emulsified by sonication or homogenization to form the primary emulsion. The primary emulsion ($W_1$/O) is added into an external aqueous solution of an appropriate stabilizer (e.g., a surfactant) and emulsified by sonication or mechanical stirring to form a double emulsion ($W_1$/O/$W_2$). The formation of the double emulsion is followed by evaporation of the organic solvent for microbubbles hardening or solidification. After solvent removal, the microbubbles are collected by centrifugation, followed by inner phase removal by freeze-drying.

Embodiments of the present disclosure relate to PLGA microbubbles produced by the double emulsion solvent evaporation process, modified so as to provide PLGA microbubbles that produce desired and controllable cavitation intensities and/or yields. The manufacturing process parameters which govern the physical properties and cavitation activity yield of the contemplated microbubbles include, for example, the type of organic solvent, the type of inner and/or external phase, the Mw of PLGA, the type and concentration of surfactants, the ratio of inner phase and organic phase and the like. The term "modified", when used in reference to the double emulsion solvent evaporation method described herein, means that at least some parameters or conditions of the method contemplated herein are modified compared to corresponding parameters or conditions of double emulsion processes known in the art.

Some embodiments of the modified double emulsion process of fabricating PLGA microbubbles involve the use of a partially hydrolyzed PVA as both the first surfactant and second surfactant. In accordance with these embodiments, a plurality of microbubbles comprising a polymeric shell encapsulating a gas, wherein at least a portion of the microbubbles comprise a PLGA shell of a predetermined lactic acid:glycolic acid ratio, are produced by a double emulsion process comprising the steps of:
  (i) obtaining an organic phase (O) comprising the PLGA copolymer and an organic solvent;
  (ii) obtaining a first aqueous phase ($W_1$) comprising partially hydrolyzed polyvinyl alcohol (PVA) in an amount in a range of from about 0.1% w/v to about 15.0% w/v;
  (iii) obtaining a second aqueous phase ($W_2$) comprising partially hydrolyzed PVA in an amount in a range of from about 0.5% w/v to about 15.0% w/v;
  (iv) combining the organic phase and the first aqueous phase under emulsification conditions to obtain a first microemulsion $W_1$/O, having a $W_1$:O volume ratio of from about 0.5:10.0 to about 5.0:10.0;
  (v) combining a portion of the first microemulsion $W_1$/O with the second aqueous phase under emulsification conditions to obtain a second microemulsion $W_1$/O/$W_2$;
  (vi) evaporating the organic solvent; and
  (vii) harvesting the microbubbles, washing and, optionally, subjecting them to lyophilization.

The PVA used in the process of making at least a portion of the microbubbles contemplated herein, has a molecular weight (Mw) in a range of from about 10 KDa to about 200 kDa.

Partially hydrolyzed PVA is a biocompatible, low cytotoxic and degradable synthetic polymer which is synthesized by hydrolysis of polyvinyl acetate. It is generally classified into two groups, partially hydrolyzed PVA (A), and fully hydrolyzed PVA (B), presented by the chemical formulae:

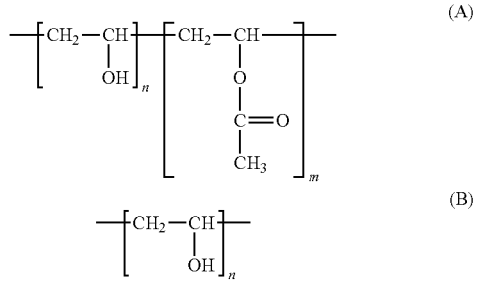

PVA stabilizes the O/$W_2$ microemulsion via steric stabilization. The hydrophobic acetate groups adsorb on the oil (polymer+organic solvent) surface while the hydrophilic hydroxyl groups dangle in the aqueous phase and provide steric repulsion. A similar stabilization may occur in the $W_1$/O interface, resulting in an arrangement of the molecules that may prevent leakage of water from the inner phase ($W_1$) to the outer phase ($W_2$), and consequently single-core structured microbubbles are obtained.

The degree of hydrolysis and the PVA's Mw determine its properties (solubility, viscosity and the like) and have a significant effect on the microemulsion's stability. For different PVAs with a similar Mw, less hydrolyzed PVA induces more stable microemulsions, due to a higher degree of hydrophobicity (higher content of acetate groups).

At least some of the microbubbles disclosed herein are synthesized providing partially hydrolyzed PVA to at least one of $W_1$ or $W_2$, wherein the degree of hydrolysis is from about 80% to about 97%, for example from about 85% to about 92%, from about 86% to about 90% or from about 87% to about 89%.

The PVA used in a contemplated process may be a high Mw PVA, defined herein as a PVA of Mw in the range of from 74 Ka to about 200 KDa, for example, from about 74 KDa to about 97 KDa, from about 80 KDa to about 130 KDa, from about 85 KDa to about 124 KDa, from about 121 KDa to about 130 KDa, from about 124 KDa to about 152 KDa, or from about 140 KDa to about 200 KDa.

Additionally, or alternatively, The PVA used in a contemplated process may be a low Mw PVA, defined herein as a PVA of Mw in the range of from about 12 KDa to about 70 KDa, for example, from about 12 KDa to about 25 KDa, from about 20 KDa to about 35 KDa, from about 28 KDa to about 55 KDa, from about 31 KDa to about 50 KDa, from about 42 KDa to about 65 KDa, or from about 50 KDa to about 70 KDa.

The PVA used for stabilizing the first aqueous phase $W_1$ and the second aqueous phase $W_2$ may be of the same molecular weight or of different molecular weights. For example, PVA in $W_1$ may be a low Mw PVA, while a high Mw PVA may stabilize $W_2$. The choice of PVA affects the morphology of the fabricated microbubbles and is therefore determined by the intended use of the microbubbles.

The amount of PVA in $W_1$ and $W_2$, may be in any of the ranges defined herein for the first surfactant and second surfactant.

In some embodiments, the amount of PVA in $W_1$ is within a range of from about 0.5% w/v to about 6.0% w/v, for example, about 1.0% w/v, about 2.0% w/v, about 3.0% w/v, about 3.5% w/v, about 4.0% w/v, about 4.5% w/v, about 5.0% w/v, or about 6.0% w/v.

In some embodiments, the amount of PVA in $W_2$ is within a range of from about 2.5% w/v to about 10.0% w/v, for example, about 2.5% w/v, about 3.0% w/v, about 3.5% w/v, about 4.0% w/v, about 4.5% w/v, about 5.0% w/v, about 5.5% w/v, about 6.0% w/v, about 7.0% w/v, about 7.5% w/v, about 8.0% w/v, about 8.5% w/v, or about 9.0% w/v.

In some exemplary embodiments, the surfactant in $W_1$ is a partially hydrolyzed PVA of molecular weight in the range of from about 80 KDa to about 130 kDa and an amount of 0.5% to about 6% w/v, and the surfactant in $W_2$ is a partially hydrolyzed high Mw PVA as defined herein. In some exemplary embodiments, the surfactant in $W_1$ is partially hydrolyzed PVA of molecular weight in the range of from about 28 KDa to about 55 kDa and an amount of 1% w/v to about 10% w/v, and the surfactant in $W_2$ is a partially hydrolyzed high Mw PVA as defined herein.

The present disclosure relates to polymeric microbubbles prepared form the polymer PLGA under tightly designed and controlled process parameters and conditions that enabled the fabrication of cavitating, durable microbubbles. The microbubbles disclosed herein are designed so as to afford enhanced and controllable cavitation and, moreover, are adapted to provide cavitation effects specifically tailored for specific applications.

The copolymer of poly lactic acid (PLA) and poly glycolic acid (PGA), PLGA, is an FDA-approved biocompatible and biodegradable polymer. It degrades by hydrolysis of its ester linkages to lactic acid and glycolic acid in the presence of water. Lactic acid is metabolized in the body to carbon dioxide and water, and glycolic acid is excreted by the kidney or metabolized to carbon dioxide and water. Different factors affect PLGA degradation, for example, its composition or the relative amounts of lactic acid and glycolic, i.e., the lactic acid:glycolic acid molar or weight ratio. PLGA can be polymerized with different lactic acid: glycolic acid ratios, and these ratios have significant effects on the PLGA degradation rate. Since lactic acid is less hydrophilic than glycolic acid, the higher the lactic acid content is, the more hydrophobic PLGA becomes, and the less water it absorbs, leading to slower degradation rate.

Contemplated PLGA microbubbles disclosed herein may comprise PLGA shell having a predetermined lactic acid: glycolic acid molar ratios which may be in the range of from about 0:100 to about 100:0. For example, the lactic acid: glycolic acid molar ratio may be about 0:100, about 0.5: 99.5, about 2:98, about 5:95, about 10:90, about 15:85, about 20:80, about 30:70, about 35:65, about 40:60, about 45:55, about 47:53, about 50:50, about 55:45, about 60:40, about 65:35, about 70:30, about 75:25, about 77:23, about 80:20, about 85:15, 90:10, about 95:5, about 99:1 or about 100:0, and any ratios therebetween.

In at least some PLGA microbubbles contemplated herein, the lactic acid:glycolic acid molar or weight ratio is about 50:50.

The molecular weight of PLGA may affect its mechanical properties and/or microbubbles size and, under cretin conditions, may also affect its degradation and, cavitation efficacy. For a PLGA polymer having the same composition (e.g., molar ratio) of lactic acid and glycolic acid, the higher the molecular weight is, the longer is the chain length, resulting in a lower degradation rate.

Contemplated PLGA microbubbles disclosed herein may be fabricated form PLGA having a Mw in the range of from about 40 KDa to about 120 KDa. For example, the PLGA Mw may be in a range of from about 43 KDa to about 60

KDa, from about 50 KDa to about 90 KDa, from about 45 KDa to about 100 KDa, from about 60 KDa to about 115 KDa, or from about 80 KDa to about 120 KDa.

In exemplary embodiments, PLGA in Mw of about 80 KDa, about 90 KDa, about 96 KDa or about 112 KDa was used for the preparation contemplated microbubbles.

The main advantage of using PLGA as the polymeric shell in microbubbles described herein is the ability to adjust its properties to different needs. By changing the Mw and the lactic acid:glycolic acid molar ratio, microbubbles can be obtained having different structures, degradation times and mechanical properties and, therefore, different cavitation activities yields.

Contemplated PLGA microbubbles disclosed herein have a thin, non-porous shell. As defined herein, a thin shell is of a thickness of from about 100 nm to about 800 nm. For example, from about 100 nm to about 300 nm, from about 200 nm to about 550 nm, from about 300 nm to about 650 nm, or from about 600 nm to about 800 nm.

Contemplated PLGA microbubbles disclosed herein have a narrow size distribution. At least a portion of the PLGA microbubbles disclosed herein are intended for therapeutic use and are particularly suitable for injection, e.g., to a human body. As such, more than 99% of the contemplated microbubbles have a diameter of less than 10 µM. For example, about 82%, about 97%, about 99% or about 99.8% of the microbubbles may be less than 10 µM in size.

About 80% of the microbubbles may have a diameter of less than 5 µM. Most of the contemplated microbubbles (70-99.8%) are hollow spheres having a diameter of from about 1 µM to about 10 µM, and 75-85% have a diameter of from about 1.0 µM to about 5 µM, for example, from about 1.2 µM to about 2.0 µM, from about 1.5 µM to about 2.5 µM, from about 2.5 µM to about 3.5 µM, or from about 3.0 µM to about 4.0 µM.

PLGA microbubbles disclosed herein are stable and durable microbubbles that may have a prolonged circulation time in a biological system before being destructed, e.g., by ultrasound pressure. For example, the microbubbles may circulate in a biological system (i.e., in vivo) and remain stable for at least 5 min, and mostly from about 3 min to about 15 min, before cavitation activity is induced. Microbubbles stability, as referred to herein, is mechanical, physical and chemical stability. Physical stability encompasses efficiency of gas entrapment.

The contemplated microbubbles are particularly designed and fabricated as cavitation nuclei, whereby they are applicable as cavitation source and useful in various acoustic cavitation applications.

The term "cavitation", as used herein, refers to a phenomenon in which rapid changes of pressure in a liquid lead to the formation of small vapor-filled cavities in places where the pressure is relatively low. When subjected to higher pressure, these cavities, also termed "bubbles" or "voids", collapse and can generate an intense shock wave.

The term "acoustic cavitation", as used herein, refers to the formation of gas bubbles, and activity (growth, oscillations or collapse) of existing gas bubbles in a medium exposed to ultrasound waves. When bubbles in a liquid medium are exposed to ultrasound, they oscillate or collapse and generate acoustic emission, i.e., cavitating gas bubbles are secondary sources of acoustic sound. There are two types of acoustic cavitation: stable and inertial. Stable cavitation is prolonged oscillations (for a considerable number of cycles) of gas bubbles in response to pressure changes. The bubbles expand during the rarefaction phase and contract during the compression phase. The stable oscillations create a liquid flow around the bubble, known as microstreaming, that induces shear stress. If the bubbles are located near a biological tissue these shear stresses can cause pore formation and affect cell permeability.

Inertial cavitation occurs in higher pressure amplitudes, when the pressure amplitude is sufficiently high and reaches a critical value (inertial cavitation threshold). The bubble grows and collapses violently; during the collapse, symmetrical shockwaves with high pressure (exceeding 10 Kbar) can be generated. When the bubbles are close to a solid surface, the collapse is asymmetrical, and a liquid jet may be created. When the collapse occurs near a biological tissue, it can cause membrane perforation, reversible pore formation and/or blood vessel permeabilization.

Ultrasound (US) is a sound wave with frequency above 18 KHz which is the limit of human hearing. The ultrasound wave is a longitudinal wave, i.e., the direction of propagation is the same as the direction of oscillation. Ultrasound wave is also termed "pressure wave" since it causes compression and expansion of the medium, leading to pressure variations in the medium. The US wave frequency (f) is the number of pressure variation cycles in the medium per unit time (vibrating rate) and is measured in Hertz (Hz), each cycle is composed of compression and rarefaction. The wave amplitude (A) describes the maximum local pressure which is measured in Pascal units (Pa).

A typical ultrasound induction apparatus contains a piezoelectric transducer which converts electrical signals into ultrasound waves. By applying an alternating voltage across a piezoelectric material, the material oscillates at the same frequency as the driving current. The transducer can operate in continues mode (repeated cycles) or in pulse mode (cycles separated in time with gaps with no signal). Ultrasound waves, which propagate through multiple tissue layers, can be focused or targeted to a small volume in a specific organ or tissue inside the body for treatment purposes, and the transferred energy, which in some conditions can lead to tissue heating and destruction, can be concentrated or localized at a predetermined specific target or spot in the tissue or organ with no adverse effects to the entire tissue or adjacent organs, thereby obtaining a localized acoustic cavitation.

High intensity focused US (HIFU) is a noninvasive therapeutic technique in which high-intensity ultrasound waves are focused onto a small region deep within a target tissue, while tissues surrounding the treated area are not affected. The ultrasound waves can be focused geometrically by using single element spherical bowl or plane transducer with a lens. Another way to focus ultrasound waves is to use a large number of transducers (array) where each transducer can be operated independently at different time. Applying time delay between transducers (phase array) cause the waves to converge (constructive interference) at a specific depth. In this method the beam is electronically steered and focused. A non-limiting example of a HIFU device is the Exablate™ Neuro (InSightec Ltd., Israel) that uses focused ultrasound (FUS) combined with magnetic resonance imaging (MRI) for the purpose of providing high resolution imaging of the treated area in real time.

Cavitation activity and threshold of contemplated microbubbles can be affected by various parameters, such as ultrasound frequency, ultrasound intensity, and temperature. Cavitation threshold increases and activity decreases with increasing frequency of the ultrasound waves. The negative pressure produced by the rarefaction phase of the sound wave is insufficient in its duration to initiate cavitation. In addition, the compression phase occurs faster than the time required for the bubble to collapse. Cavitation activity increases with increasing ultrasound intensity. Higher intensity results in higher acoustic pressure amplitude, causing a more violent collapse of microbubbles. Cavitation threshold decreases with increasing sample's temperature, since temperature increment leads to a reduction in liquid viscosity (it is more difficult to produce cavitation in viscous liquids).

The acoustic emissions generated by the cavitating microbubbles depend on the driving frequency $f_0$ (a fundamental frequency). Acoustic emissions include harmonic frequencies ($nf_0$, n=2, 3, 4 . . . ), subharmonic frequencies ($f_0/n$, usually n=2, but can also be 3, 4 . . . ), ultra-harmonic frequencies ($(2n+1)f_0/2$, n=1, 2, 3, 4 . . . ), and broadband noise. The harmonic, subharmonic and ultra-harmonic frequencies can be caused by nonlinear oscillations of the microbubbles and are associated with stable cavitation. However, harmonic emissions can also occur without any cavitation activity due to nonlinear ultrasound wave propagation in the medium. For this reason, stable cavitation detection based on the presence of harmonic frequencies is not common and monitoring of the subharmonic frequency $f_0/2$ is more commonly used. Broadband noise emissions produced by the violent collapse of the microbubbles are an indication of inertial cavitation.

There is a correlation between the exitance of subharmonic emissions and several bioeffects, such as blood-brain barrier disruption and thrombolysis (Bader and Holland, *Physics in Medicine & Biology* 58:127 (2012)). Broadband noise emissions have been correlated to bioeffects such as drug release from intravenously delivered liposomes (Graham et al. *Journal of Controlled Release* 178:101-107 (2014)) and sonoporation in HeLa cells (Lai et al., *Ultrasound Med. Biol.* 32:1931-1941 (2006)).

The acoustic emissions can be passively detected and recorded by passive cavitation detection (PCD) method. Passive cavitation detection method uses a single element transducer, called a passive cavitation detector (hydrophone), to capture the acoustic emissions over time, and by Fast Fourier Transform (FFT) algorithm to convert the time spectra to frequency spectra (taught, for example, by Ding et al., *Cavitation in Biomedicine* 47-114 (Springer, 2015) and Haqshenas and Saffari, Journal of Physics: Conference Series Ser. 581, IOP Publishing, (2015)).

Gas solubility in the blood is expressed by the Ostwald coefficient. Gases with low Ostwald coefficients dissolve more slowly compared to gases with high Ostwald coefficients. The first-generation microbubbles were filled with air (e.g., Albunex®). However, due to the relatively high solubility of air in blood, these microbubbles had short half-life. The second and third generation of microbubbles, contain inert heavy gases such as, perflouropropane ($C_3F_8$), sulfur hexafluoride ($SF_6$) or low boiling point liquid perflourohexane ($C_6F_{14}$), which have higher molecular weights and lower water solubility than air. Since heavy gases' diffusivity across the microbubble's shell is slow, circulation time and stability of contemplated microbubbles encasing heavy gasses is increased relative to air-encasing microbubbles. Table 1 summarizes the properties of different gases that may be used as microbubble core in accordance with some embodiments described herein.

TABLE 1

Properties of different gases used as microbubbles core

| Gas | Mw [g/mol] | Ostwald coefficient ($\times 10^6$) | Diffusivity coefficient in water $m^2s^{-1}$ ($\times 10^{10}$) |
|---|---|---|---|
| Air | 29 | 17,100 | 20.5 |
| $SF_6$ | 146 | 5400 | 12 |
| $C_3F_8$ | 188 | 520 | 7.45 |
| $C_4F_{10}$ | 238 | 202 | 6.9 |

Therapeutic Applications of Cavitating Microbubbles

An aspect of the present disclosure relates to the use of the synthetic microbubbles disclosed herein in various applications, such as producing an acoustic cavitation in a biological system. When applied for producing inertial cavitation or a stable cavitation in an organ, a tissue or a portion thereof, in the body of a subject, the disclosed microbubbles are particularly useful in various therapeutic applications.

For example, combining the microbubbles with ultrasound waves may be utilized for at least one of: opening of various biological barriers in the body and increasing the drug uptake in these tissues, for example, enhancing transdermal drug delivery; treatment of vascular thrombosis; ablation of cancerous or non-cancerous solid tumor; and destruction of adipocytes.

Disclosed herein are methods for treating diseases, disorders or conditions that may be cured or ameliorated by increasing the permeability of a biological barrier, and/or by ablation, whereby the disclosed microbubbles are being used as cavitation nuclei.

Embodiments of the present disclosure relate to a method for increasing permeability of a membrane, a tissue, or a biological barrier in a tissue or a portion thereof, in a subject in need thereof, the method comprising the steps of:
(a) administering to the subject a therapeutically effective amount of a plurality of microbubbles as disclosed herein; and
(b) stimulating the microbubbles in a predetermined desired region in the subject's tissue by the application of a local acoustic pressure to create a localized acoustic cavitation, thereby increasing the permeability of the membrane or of the membranal barrier in a tissue or a portion thereof in the subject.

There are several blood-tissue barriers that prevent the entry of various drugs from the bloodstream to a desired organ, which can be manipulated by applying local acoustic cavitation using the contemplated microbubbles, such as, but not limited to, the blood-brain barrier (BBB), blood-retinal barrier (BRB) and blood-testis barrier (BTB).

The BBB is a specialized structure of the blood vessel wall that limits transport of molecules from the vasculature to the central nervous system (CNS) and prevents passage of ionized water-soluble molecules with Mw greater than 180 Da. It consists of endothelial cells connected to each other by tight junctions (TJ). The TJ contain several transmembrane and membrane-associated cytoplasmic proteins. Focus ultrasound (FUS) applied to the contemplated microbubbles may increase the BBB permeability and enhance the drug's entry to the brain tissue due to the disruption of the TJ.

The BRB in the eye consists of two components: retinal capillary endothelial cells (inner BRB) and retinal pigment epithelial cells (outer BRB). The both inner and outer BRB contain TJ between adjacent cells. The BRB limits the delivery of most therapeutic agents to the retina. Combining FUS with the contemplated microbubbles may increase the BRB permeability and enhance drug entry to the retina.

The BTB in mammalian testes is one of the tightest blood-tissue barriers, which prevents the entry of materials that can cause damage to the developing germ cells. The BTB is composed of junctions between adjacent Sertoli cells near the basement membrane. The Sertoli cells are epithelial cells which provide nutritional and structural support to developing germ cells. This barrier can act as an obstacle to chemotherapy, i.e. the BTB can impedes the delivery of chemotherapeutic drugs to the testis. Combining ultrasound waves and the contemplated microbubbles may increase the BTB permeability and enhance chemotherapeutic drugs entry to the testis.

Embodiments of the present disclosure relate to a method for ablation of a tissue or a part thereof in a subject in need thereof, the method comprising the steps of:
  (a) administering to the subject a therapeutically effective amount of a plurality of microbubbles as described herein; and
  (b) stimulating the microbubbles in a predetermined desired region in the subject's organ or tissue by the application of a local acoustic pressure to create a localized acoustic cavitation, thereby ablating the tissue or a part thereof in the subject.

Non-invasive high intensity focused ultrasound (HIFU) procedure can be used, in accordance with embodiments described herein, in combination with the contemplated microbubbles, to ablate small region/volume in a desired tissue without damaging the surrounding healthy tissue. For example, ablation of prostate tumor, breast tumor, uterine fibroids, liver tumor, pancreatic cancer and bone tumor.

Two mechanisms are involved in the ablation process, the first of which is a thermal effect. Absorption of the acoustic energy can cause a local increase in temperature. In most tissues, temperature increasing to more than 60° C. for one second will cause cell death. The second mechanism is mechanical effects such as cavitation, micro-streaming, and radiation force. Microbubbles can increase HIFU ablation rate by reduction of the acoustic energy required to cause lesion in the tissue. While ablation treatments can last for several hours, lipid microbubbles have a relatively low stability and short lifetime, and are, therefore, less suitable for this therapy as opposed to the durable PLGA microbubbles disclosed herein, that have a higher stability and longer lifetime required for ablation procedures.

The microbubbles disclosed in the present disclosure can be administrated to a subject by a systemic route, a local route or a combination thereof. In some embodiments, the contemplated microbubbles are administered by infusion. In some embodiments, the contemplated microbubbles are administered by injection, e.g., bolus injection.

Pharmaceutical Compositions

In a further aspect, the present disclosure relates to pharmaceutical compositions comprising a plurality of PLGA microbubbles as described herein, and a pharmaceutically acceptable excipient. In some embodiments, the composition is a formulation for pharmaceutical administration and comprises a pharmaceutically acceptable carrier.

The term "pharmaceutical composition", as used herein, refers to a composition essentially comprising PLGA microbubbles, which may be adapted for clinical utilization such as, but not limited to, therapeutic or diagnostic utilization. "Formulation", as used herein, refers to any mixture of different components or ingredients, at least one of which is a plurality of PLGA microbubbles, prepared in a certain way, i.e., according to a particular formula so as to be applicable for administration to a subject. Such formulation is termed herein "microbubbles formulation". For example, a microbubbles formulation may be formulated for administration by infusion or by injection and may include PLGA microbubbles combined or formulated together with, for example, one or more carriers, excipients, stabilizers and the like. Usually, a microbubbles formulation comprises one or more pharmaceutically and physiologically acceptable carriers, which can be administered to a subject (e.g., human or non-human subject) in a specific form.

As used herein, the terms "pharmaceutically acceptable", "pharmacologically acceptable" and "physiologically acceptable" are interchangeable and mean approved by a regulatory agency of the Federal or a state government or listed in the U.S. Pharmacopeia or other generally recognized pharmacopeia for use in animals, and more particularly in humans. These terms include formulations, molecular entities, excipients, carriers and compositions that do not produce an adverse, allergic or other untoward reaction when administered to an animal, or a human, as appropriate. For human administration, preparations should meet sterility, pyrogenicity, general safety and purity standards as required by, e.g., the U.S. Food and Drug Administration (FDA) agency, and the European Medicines Agency (EMA).

Herein the term "excipient" refers to an inert substance added to a pharmaceutical composition or formulation to further facilitate process and administration of the active ingredients. "Pharmaceutically acceptable excipients", as used herein, encompass approved preservatives, antioxidants, surfactants (e.g., Tween®-20, Tween®-40, Tween®-60 and Tween®-80), a buffer, coatings, isotonic agents, absorption delaying agents, carriers and the like, that are compatible with pharmaceutical administration, do not cause significant irritation to an organism and do not abrogate the biological activity and properties of a possible active agent. Physiologically suitable carriers in liquid formulations may be, for example, solvents or dispersion media.

A disclosed formulation may be used for at least one of: (i) treatment of vascular thrombosis; (ii) ablation of cancerous or non-cancerous solid tumor; (iii) enhancement of transdermal drug delivery; (iv) enhancement of uptake of chemical or biological therapy in cells and tissue; or (iv) destruction of adipocytes, in accordance with any of the methods described herein.

Kits

In still a further aspect, the present disclosure relates to a kit comprising a plurality of PLGA microbubbles or a microbubbles formulation, as defined herein, and, optionally, instructions and means for administration of the microbubbles and/or the formulation to a subject in need thereof.

A contemplated kit is useful for producing enhanced cavitation activity which may find use in the treatment of at least one of: (i) treatment of vascular thrombosis; (ii) ablation of cancerous or non-cancerous solid tumor; (iii) enhancement of transdermal drug delivery; (iv) enhancement of uptake of chemical or biological therapy in cells and tissue; or (iv) destruction of adipocytes.

A contemplated kit may be operable, for example, in a MR-guided focused ultrasound (MRgFUS) clinical procedure, in accordance with embodiments described herein.

It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

As used herein the term "about" refers to +10%.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Various embodiments and aspects of the present invention as delineated hereinabove and as claimed in the claims section below find experimental support in the following examples.

EXAMPLES

Reference is now made to the following examples, which together with the above descriptions illustrate some embodiments of the present disclosure in a non-limiting fashion. Generally, the nomenclature used herein, and the laboratory procedures utilized in the present disclosure include molecular, chemical, biochemical and/or microbiological techniques. Such techniques are thoroughly explained in the literature. See for example, Guide to Research Techniques in Neuroscience (Second Edition), Matt 2015; Elsevier's Integrated Review Biochemistry (Second Edition), 2012. Other general references are provided throughout this document. The procedures therein are believed to be well known in the art and are provided for the convenience of the reader. All the information contained therein is incorporated herein by reference.

Materials

The following material were purchased from Sigma-Aldrich Inc.: polyvinyl alcohol (PVA) average Mw 85-124 KDa, 87-89% hydrolyzed (363081); PVA average Mw 31-50 KDa, 87-89% hydrolyzed; Nile Red (N3013); Isopropyl alcohol, laboratory reagent, ≥99.5% (109827); and Ethyl acetate, ≥99.7% (34858). GOT Multi SF6 pure sulfur hexafluoride 75 mL (ALC_GOT 007-00), and GOT Multi C3F8 pure octafluoropropane 75 mL (ALC GOT 009-00), were purchased from Alpha Net LTD. Perfluoropropane (PFC-218) 99.9% (PC6210-100 g), was purchased from Tzamal D-Chem Laboratories Ltd. PLGA (50:50 7A, 96 kDa) was purchased from Lakeshore Biomaterials (Birmingham, AL, USA).

PVA Stock Solutions

Ten grams (10.0 g) of high Mw PVA (85-124 KDa) or 20.0 g of low Mw PVA (31-50 KDa) were slowly added to 150 ml of deionized water. The mixture was stirred continuously until the powder was fully dispersed, and then heated to 90° C. under stirring, until complete dissolution of the powder. After full dissolution, the heater was turned off and the solution was continuously stirred until it reached room temperature. The solution was transferred to a graduated cylinder and deionized water was added to reach a total volume of 200 ml. Stock solutions of 5% w/v high Mw PVA or 10% w/v low Mw PVA were thus obtained. Preparation of all PVA solutions for the double emulsion process described herein was performed by diluting the stock solutions with deionized water.

Nile Red Stock Solution

The solvatochromic dye Nile red was used for fluorescently labeling PLGA microbubbles. One milligram (1.0 mg) of Nile red was dissolved in 16 ml ethyl acetate to obtain a stock solution of 0.0625 mg/ml. The solution was stored protected from light.

Isopropanol Solution

Five milliliters (5.0 ml) of isopropanol was dissolved in 95 ml of deionized water to obtain 5% v/v isopropanol solution.

Methods

Inner Structure Characterization

Fluorescently labeled PLGA MBs were dispersed in deionized water and were placed in a confocal dish. An UltraView ERS FRET-H spinning disc confocal system (PerkinElmer Life Sciences Inc., MA, USA) equipped with an argon-krypton laser source (Melles Griot, excitation 568 nm), and a microscope Axiovert-200 M (Zeiss, Germany) was used to evaluate the inner structure of the fabricated microbubbles. All confocal fluorescence pictures were taken with a Plan Apochromat magnification ×63, numerical aperture 1.4 (63×/1.4)) oil objective. The imaging software was UltraView ERS Software 3.1.0.021.

Morphology Characterization

Microbubbles morphology was evaluated by scanning electron microscopy (SEM). Lyophilized microbubbles were dispersed in deionized water and placed on silicone grid. After full drying, the sample was coated with gold (Au) using K575X Sputter Coater (Quorum Technologies Ltd). SEM images were acquired on the JSM-7400F high-resolution scanning electron microscope (Jeol).

Evaluation of Microbubbles Chemical Composition

The chemical composition of lyophilized microbubbles was determined using Nicolet 6700 Fourier transform infrared (FTIR) spectrometer (Thermo Scientific, USA). Spectra were recorded in transmission mode between 4000 and 650 $cm^{-1}$ with 34 scans and a resolution of 4 $cm^{-1}$. Samples containing microbubbles were crushed in a mortar and pestle so that substances that may be encapsulated inside the microbubbles (such as PVA), may also be detected. The samples were added directly to the device, without further treatment. Raw PLGA and raw PVA were used as controls.

Cavitation Measurements (i) Encasing Gas in the Core of Synthetic Microbubbles

Lyophilized microbubbles prepared as described in Example 1 herein were weighed and inserted into a headspace vial, and the vial was sealed by a screw cap with 1.3 mm silicone septum. Empty 50 ml syringe, 10 ml syringe filled with the desired gas and a 27 G needle, were connected to a 3 ways stopcock. The air inside the vail was drawn using the 50 ml syringe to form a vacuum, then the desired gas in the 10 ml syringe was injected into the vial. The MBs were dispersed with the desired volume (3 ml-7 ml) of degassed water, which was injected with an additional syringe and needle (23 G) through the septum cap, to prevent gas leakage.

(ii) Cavitation Measurement System

In vitro cavitation measurements were carried out using a setup based on the passive cavitation detection (PCD) method developed by InSightec Ltd., Israel. A schematic diagram of the apparatus is shown in FIG. 8.

Figure 8:
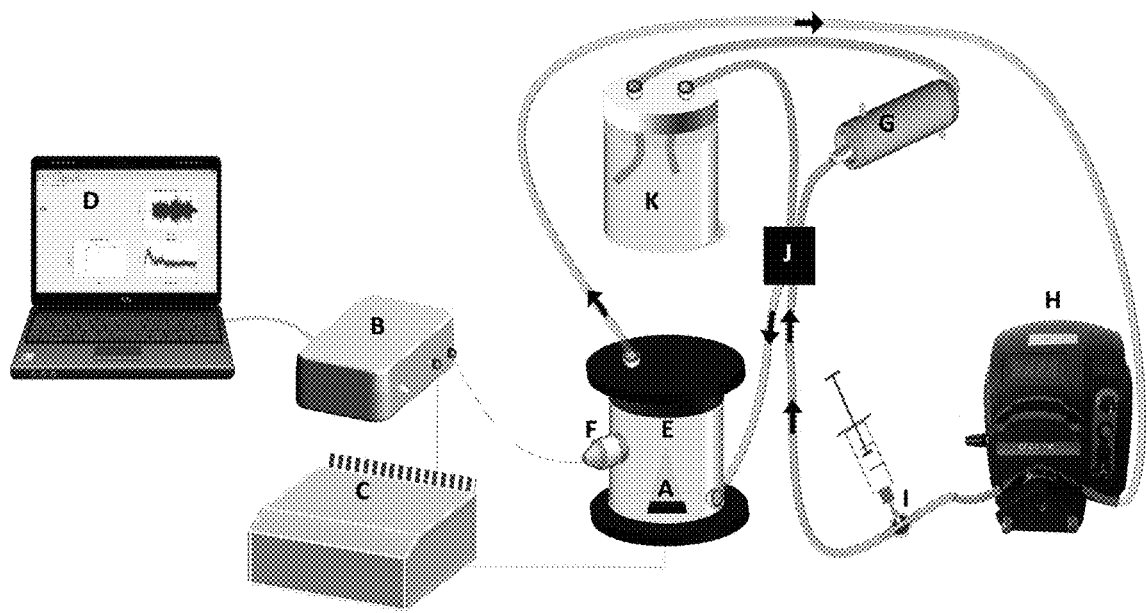
FIG. 8 is a schematic diagram of an in vitro cavitation measurement apparatus. (A) chamber filled with degassed water and containing an ultrasound transducer tile; (B) oscilloscope with a built-in function generator; (C) power amplifier; (D) MATLAB software; (E) acoustic absorber material; (F) hydrophone; (G) degassing system; (H) peristaltic pump; (I) valve for microbubbles injection; (J) multi-directional valve; and (K) water reservoir.

An US transducer tile of a piezoelectric material (32×32 mm, InSightec Ltd., Israel) was placed at the bottom of a chamber filled with degassed water (A in FIG. 8). The transducer was operated in pulse wave mode (cycles separated in time with gaps with no signal). A pulse mode is characterized by the at least the following parameters: pulse duration (PD), the time from the start to the end of a pulse; pulse repetition period (PRP), the time between the beginning of one pulse and the beginning of the next pulse; and duty factor (DF), which is PD divided by the PRP. For in vitro cavitation measurements described herein, the transducer was operated at a frequency of 200 KHz and at the following parameters: PD=5 ms, PRP=200 ms, giving a DF of 2.5%.

The transducer was driven by a sinusoidal wave generated by PicoScope® 5000 Series oscilloscope (Pico Technology, UK) with a built-in function generator (B in FIG. 8), together with a power amplifier (C in FIG. 8). MATLAB software (D in FIG. 8) was used for controlling the pico-oscilloscope.

Acoustic absorbing material (E in FIG. 8) was located at the top of the chamber to prevent ultrasound reflection, and a receiver (hydrophone manufactured by InSightec) was placed at an angle of 900 to the direction of wave propagation (F in FIG. 8). The acoustic emissions generated by the MBs activity in the chamber caused pressure variations in the liquid medium, which were received by the hydrophone and converted into voltage variations. These variations were recorded by the same digital pico-oscilloscope, and the data was analyzed using MATLAB software. In addition, the apparatus contained a degassing system (G in FIG. 8) to supply degassed water to the chamber in-between measurements, and a peristaltic pump (PP-X-575, MRC, Israel) for circulating the microbubbles (H in FIG. 8).

At measurement mode, the microbubbles were injected into the system pipes trough a valve (I in FIG. 8), through which they were transferred to a multi-directional valve (J in FIG. 8), and then passed through a pipe to the measurement chamber from the bottom of the chamber. The microbubbles exited the measurement chamber from the top of the chamber, back to the peristaltic pump, repeatedly.

Between measurements, it was necessary to degas the water in the system to ensure that the measured cavitation was caused by the activity of microbubbles examined in the specific experiment, and not as a result of existing gas bubbles in water, or microbubbles from a previous experiment, which remained in the system. Therefore, between measurements, the system was switched to the degassed mode: the liquid was directed to the multi-directional valve and then to a water reservoir (K in FIG. 8). From the reservoir, the fluid passed through the degassing system to the measurement chamber (from the bottom) and exited from the top of the chamber back to the peristaltic pump, repeatedly.

(iii) Data Analysis

The data were analyzed using MATLAB software. Recorded sound emissions were processed using fast-Fourier transform (FFT) analysis in order to convert the time spectra into frequency spectra (spectral density). Each time spectra contained data recorded for 5 msec (PD=5 ms), and from the beginning of one record to another, there was a 200-millisecond interval (PRP=200 ms). The number of spectra obtained for each measurement depended on the total measurement time.

For each frequency spectra, the cavitation band was calculated by the following equation:

$$\text{Cavitation band} = \sum_{n=0.06}^{n=0.14} s^2[n]$$

wherein, s is the frequency spectrum signal (Y-axis values in the frequency spectrum) and it has arbitrary units (a.u.). $s^2$ (arbitrary units) is known as the energy spectral density. The sum of the energy spectral densities around the subharmonic frequency (0.1 MHz) within the band (frequency width) of 0.06-0.14 MHz is defined as the cavitation band. The sum of cavitation bands for the whole sonication period is defined as the cavitation dose (CD) (arbitrary units). The cavitation dose enables to compare the cavitation activity of various microbubbles, e.g., microbubble that were synthesized under different conditions and/or were filled with different gases.

It is noted that cavitation doses measured herein are to be referred to in the context of the cavitation measurement system employed herein. Namely, cavitation doses for the same number and type of microbubbles subjected to the same acoustic pressure parameters (i.e., the transducer is operated at the same frequency, and PD and PRP are the same), but measured in a different system, are not expected to be of the same values as the cavitation doses disclosed herein. Various cavitation measurement systems are inherently variable, e.g., in their cavitation induction capacities and/or generated acoustic emissions detection.

In Vivo Experiments

In vivo experiments using single-core PLGA microbubbles synthesized with 5% high Mw in inner an external phase, and filled with $C_3F_8$ gas, were conducted with female domestic pigs (large white x land race, *Sus scrofa domestica*). Prior to each test, the pig was anesthetized by intramuscular (I.M.) injection of ketamin 10 mg/Kg and xylazin 2 mg/Kg. The animal's vital signs were continuously monitored during the entire experiments. In addition, propofol (3 mg/kg/hr) was I.V. injected to keep the animal anesthetized during the procedure. In BBB and ablation experiments the animals were ventilated by an MR compatible ventilator. In safety test endotracheal intubation was started 50 min after the beginning of the experiment.

Euthanasia was carried out at the end of the clinical procedures by I.V. injection of ketamin 10 mg/Kg+Xylazin 2 mg/Kg+KCl (15%) 20 ml.

Magnetic Resonance-Guided Focused Ultrasound (MRgFUS)

MR-guided focused ultrasound (MRgFUS) clinical procedure is a noninvasive thermal surgery, e.g., ablation, method that uses focused ultrasound technology combined with magnetic resonance imaging (MRI), wherein target definition, treatment planning, and closed-loop control of energy deposition is provided by MRI, and sound waves that pass safely through skin, bone, and muscle are produced by an ultrasound transducer. Integrating FUS and MRI as a therapy delivery system provides the benefits of anatomical surveying, localizing, targeting, and monitoring in real time and, thus, affords execution of a clinical procedure in a targeted tissue without damaging normal structures. This precision makes MRgFUS an attractive alternative to surgical resection or radiation therapy of benign and malignant tumors.

Since ultrasound can pass through skin, muscle, fat and other soft tissue, no incisions or inserted probes are needed. High intensity focused ultrasound (HIFU) pinpoints a small target and provides a therapeutic effect by raising the temperature high enough to destroy the target with no damage to surrounding tissue. For example, the spot where the sound waves converge is heated to temperatures that can cause thermal ablation. The treatment is performed while the patient lies in an MR scanner.

The neurosurgery platform Exablate Neuro™ (InSightec Ltd, Israel), was used in embodiments described herein for delivering ultrasound energy to circulating microbubbles. The cavitation procedure was monitored by a 1.5 T Signa™ MR (GE 1.5 T HDx Signa) instrument.

Statistical Analysis

All statistical analyses were performed in GraphPad Prism (version 7.00). t-test was carried out in order to compare the cavitation dose (CD) of microbubbles filled with the same gas and measured under different experimental protocol. One-way ANOVA was carried out for comparing the CD of microbubbles filled with different gases and measured under the same experimental protocol. One-way ANOVA was also carried out for comparing the CD of microbubbles with different inner structure, and the CD of free gas.

ns symbol corresponds to $p>0.05$; * corresponds to $p<0.05$;  corresponds to $p<0.01$; * corresponds to $p<0.001$; and **** corresponds to $p<0.0001$.

Example 1

Synthesis of PLGA Microbubbles

Modifications of various synthesis parameters can lead to a change in microbubbles properties such as their inner structure and/or size distribution. Polymeric microbubbles made of PLGA shell were synthesized by a modified double emulsion solvent evaporation method according to the following steps:

(i) Preparation of the Organic Phase (O)

A desired amount (between 100 to 500 mg) of PLGA of 50:50 lactic acid:glycolic acid molar ratio was weighed and added to 10.0 ml of ethyl acetate for obtaining the organic phase, (O). The solution was stirred at room temperature until full dissolution.

(ii) Preparation of a First Microemulsion ($W_1/O$)

A first or initial microemulsion was obtained by adding a PVA solution ($W_1$) to the organic phase. The solution volume and PVA concentration were selected according to the intended microbubbles. The $W_1$ volume used was in a range of from about 0.5 ml to about 3 ml, and the PVA concentrations was in a range of from about 0 to about 5% w/v for high Mw PVA or for low Mw PVA. The mixture was then emulsified by sonication with 20 KHz ultrasound using 12.7 mm diameter standard Probe (Qsonica-Q700 Sonicator) at an intensity of 21 W/cm² for 30-60 sec.

(iii) Preparation of a Second Microemulsion ($W_1/O/W_2$)

Two 4 ml portions of the initial emulsion ($W_1/O$) were each added into an external 20 ml PVA aqueous solution ($W_2$). The PVA concentration in $W_2$ was in the range of from about 0.5% w/v to about 5% w/v for high Mw PVA solution, or in the range of from about 1% w/v to about 8% w/v for low Mw PVA solutions. Emulsification was carried out by vortex-mixer (Scientific Industries-Genie 2 vortex) for 20-30 sec at 2700 rpm in a 50 ml centrifuge tube.

(iv) Solvent Evaporation

The second microemulsion $W_1/O/W_2$ obtained in step (iii) above, was added to 100 ml 5% v/v isopropanol solution, in order to extract the organic solvent, ethyl acetate, and was continuously stirred for 5 h to evaporate the organic solvent.

(v) Separation and Drying

The formed microbubbles were collected by centrifugation. The supernatant was discarded, and the precipitate was washed with deionized water (about 15 ml). The process of centrifugation and washing was repeated three times, followed by freeze-drying using a lyophilizer for at least 72 h, and preferably for at least 6 days. Cavitation activity measurements performed on lyophilized microbubbles obtained by the process described herein revealed that lyophilization duration for a period of 6 days resulted in a significant increase in cavitation activity, probably due to the removal of residual water from the microbubbles (results not shown).

The chemical composition of the fabricated microbubbles was evaluated by Fourier transform infrared (FTIR) spectrometer as described in Materials and Methods. The spectra of high Mw PVA, PLGA, PLGA microbubbles synthesized with 5% high Mw PVA in both the external and inner phases and PLGA microbubbles synthesized with 5% high Mw PVA in external phase and water in inner phase are shown in FIG. 1.

As can be seen in FIG. 1, the spectrum obtained for PLGA microbubbles synthesized with or without PVA in the inner phase ($W_1$), presented the same characteristic bands that also appeared in the spectrum of the PLGA raw material, but no traces of the typical strong transmittance band related to —OH stretching in the PVA molecules (3550-3200 cm$^{-1}$) were observed. Therefore, it can be concluded that the double emulsion synthesis did not alter the chemical structure of PLGA and that the process of microbubbles washing was successful (any PVA residues originating from the inner and/or external phase solution were negligible).

Example 2

Synthesis Parameters Affecting the Properties of Fabricated of PLGA Microbubbles Microbubbles were fabricated using the modified double emulsion process described in Example 1, under different synthesis parameters, in order to assess the effect of varying the synthesis parameters on the properties of the microbubbles. The different synthesis parameters used are summarized in Table 2. For example, the effect of adding a stabilizer (a surfactant) such as polyvinyl alcohol to the inner aqueous phase ($W_1$) on microbubbles structure and stability was assessed. Also, the effect of $W_1/O$ volume ratio on the physical properties of the microbubbles was assessed.

TABLE 2

| | Microbubbles synthesis parameters | | |
|---|---|---|---|
| Synthesis # | Amount of PLGA (mg) | Composition and volume of W1 | Composition of W2 |
| 1 | 500 | high Mw PVA 5% w/v, 3 ml | high Mw PVA 5% w/v |

TABLE 2-continued

Microbubbles synthesis parameters

| Synthesis # | Amount of PLGA (mg) | Composition and volume of W1 | Composition of W2 |
|---|---|---|---|
| 2 | 500 | high Mw PVA 5% w/v 0.5 ml, 1 ml, 2 ml | high Mw PVA 5% w/v |
| 3 | 500 | high Mw PVA 0, 0.1%, 0.5%, 1%, 2%, 5% w/V 3 ml | high Mw PVA 5% w/v |
| 4 | 500 | low Mw PVA 0, 0.1%, 0.5%, 1%, 2%, 5% w/v 3 ml | low Mw PVA 8% w/v |
| 5 | 500 | high Mw PVA 5% w/v 3 ml | high Mw PVA 0.5%, 1%, 3%, 5% w/V |
| 6 | 500 | low Mw PVA 5% w/v 3 ml | low Mw PVA 1%, 3%, 5%, 8% w/V |

(i) the Effect of Using an Aqueous Solution of a Surfactant as the Inner Phase $W_1$ Polyvinyl alcohol is a common emulsifier in double emulsion methods, usually used in the external aqueous phase to prevent aggregation and coalescence of the second emulsion droplets. The present inventors envisaged that using a PVA solution as $W_1$ in a certain manner would affect the inner structure of the microbubbles and facilitate stabilization of the inner phase. For assessing this hypothesis, varying volumes of PVA aqueous solutions comprising different concentrations of PVA, and/or PVA of different molecular weights were used as $W_1$, as disclosed in Table 2.

Microbubbles were synthesized with two different inner phases: 3 ml of deionized water (these microbubbles served as control) or 3 ml of a 5% w/v solution of high Mw PVA (Mw 85-124 KDa). The inner and external morphologies of the microbubbles were examined by confocal microscopy and SEM, respectively. Exemplary microbubbles are shown in FIGS. 2A-2D.

Figure 2A:
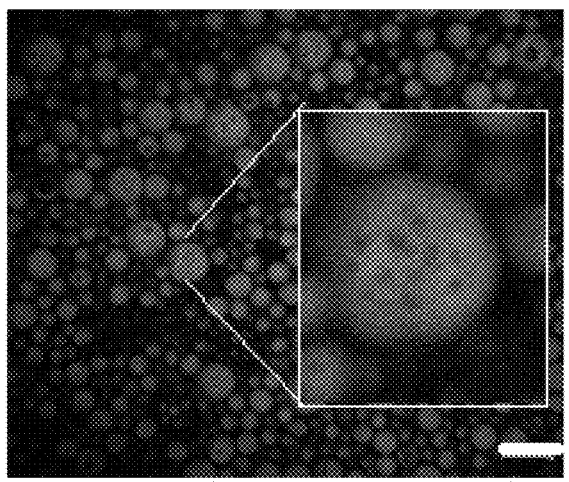
FIGS. 2A-2D are confocal imaged (FIGS. 2A, 2C) and scanning electron microscope (SEM) images (FIGS. 2B, 2D) of exemplary microbubbles synthesized by a modified double emulsion process with an inner phase ($W_1$) comprising water (FIGS. 2A, 2B) or an aqueous PVA solution (FIGS. 2C, 2D). Scale bar=10 μm.
Figure 2B:
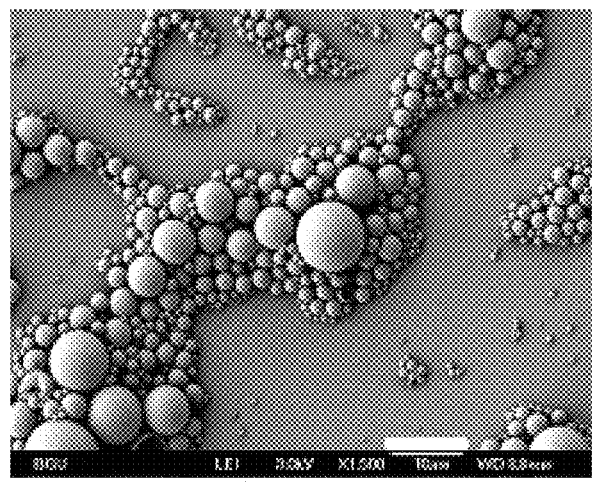

As shown in FIGS. 2A and 2B, the use of water as an inner phase resulted in microbubbles with multiple inner morphologies, such as solid structure without any cavities and a multi-core structure with several small cavities. As shown in the SEM image (FIG. 2B), these microbubbles exhibited well defined spherical shape and smooth surface.

Figure 2C:
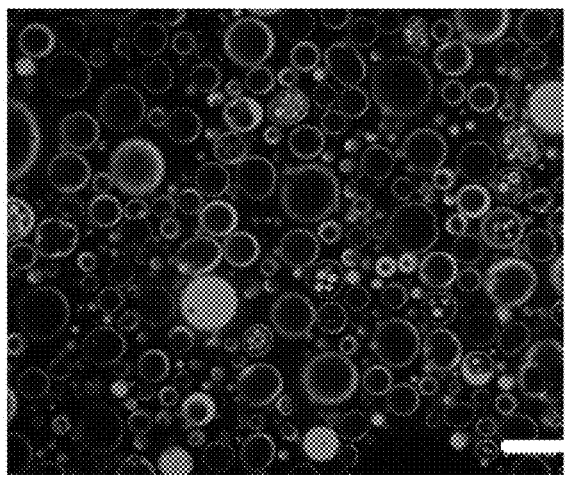
Figure 2D:
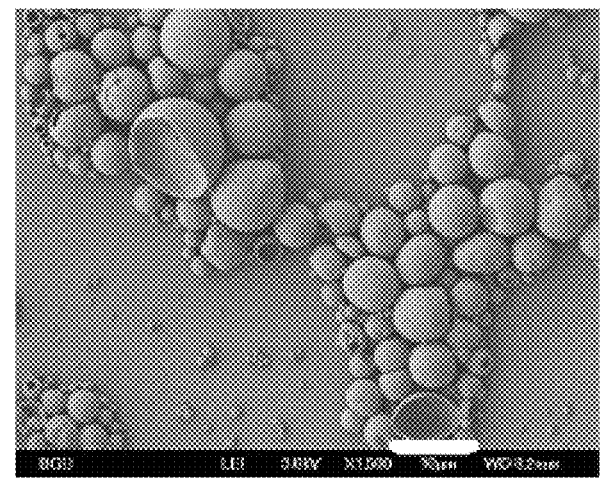

When a PVA solution was used as the inner phase, microbubbles with single core-shell structure were obtained as can be seen in the confocal image (FIG. 2C). The external morphology, as shown in the SEM image (FIG. 2D), varied from a spherical structure to an elliptical structure, and the surface had bumps and dents due to a thin shell and a hollow core structure. In addition, the rupture of the shell that occurred in some microbubbles confirmed the existence of this structure.

Inner phase stabilization caused by adding PVA to the inner water phase may be explained by a steric stabilization of the $W_1$/O microemulsion imparted by PVA. The PVA used for microbubbles fabrication was partially hydrolyzed polyvinyl alcohol, containing 11-13% acetate groups (87-89% hydrolyzed), which give the molecule its amphipathic character. PVA may stabilize the $W_1$/O interface by arranging itself such that the hydrophilic hydroxyl groups dangle in the inner aqueous phase, while hydrophobic acetate groups adsorb on the organic solvent-water interface. Such arrangement of the PVA molecules may prevent leakage of water to the outer phase.

(ii) The Effect of $W_1$/O Volume Ratio

Figure 3A:
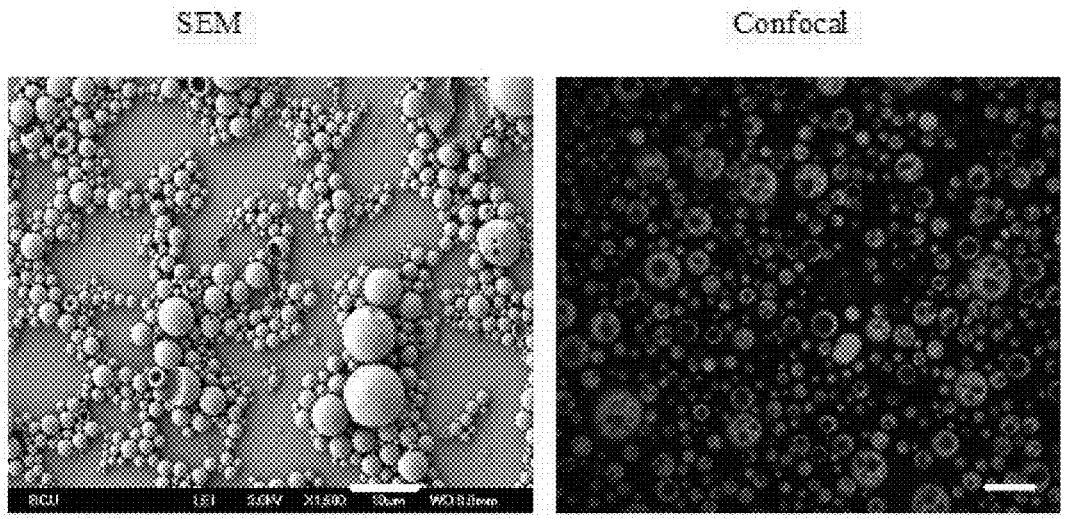
FIGS. 3A-3C are SEM images (left panels), and confocal images (right panels) of exemplary microbubbles synthesized by a modified double emulsion process, wherein the volume ratios between the inner PVA aqueous solution (5% w/v) and the organic PLGA solution ($W_1$:O) was either 0.5:10 (FIG. 3A), 1:10 (FIG. 3B) or 2:10 (FIG. 3C). Scale bar=10 μm.

As shown above, single core, thin-shell microbubbles were obtained when the volume ratio between the inner PVA solution (85-124 KDa, 5% w/v) ($W_1$ phase) and the PLGA solution (O phase) was 3:10. In order to assess whether this structure is also obtained when lower $W_1$/O volume ratio is used, and whether different volume ratios affect the microbubbles morphology- and/or size-wise, microbubbles were synthesized using three different $W_1$/O volume ratios: 0.5:10, 1:10 and 2:10 (Synthesis #2 in Table 2). The obtained microbubbles were analyzed by confocal microscope and SEM in order to characterize their inner and, external structure respectively. The results are shown in FIGS. 3A-3C.

As seen in the confocal image (FIG. 3A, right image), reducing the volume of the PVA solution from 3.0 ml to 0.5 ml, thereby decreasing the $W_1$:O ratio from 3:10 to 0.5:10, resulted in a majority of microbubbles having a multi-core structure and only a small fraction of microbubbles having single core-shell structure. As seen in the SEM image (FIG. 3A, left image), these microbubbles exhibited well defined spherical shape and smooth surface.

Figure 3B:
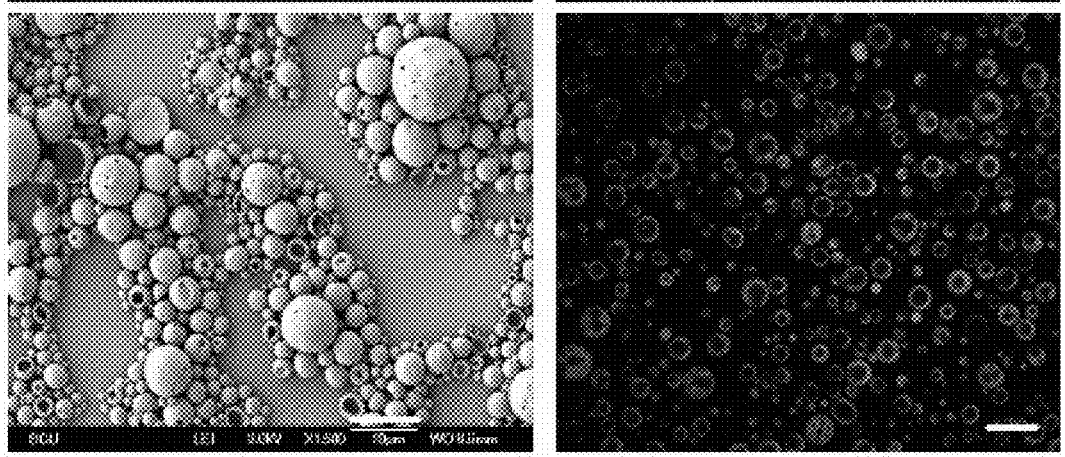
Figure 3C:
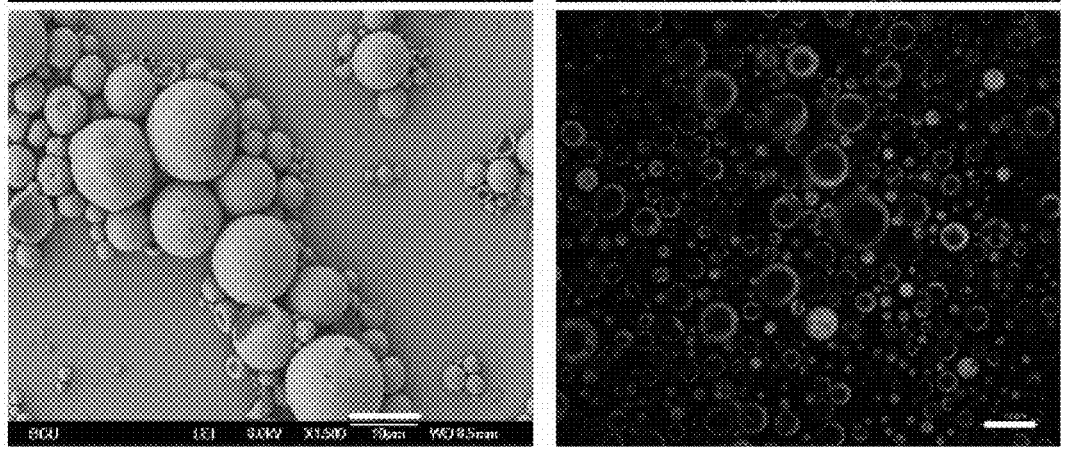

When a volume of 1 ml PVA solution was used, the number of microbubbles with a single core structure increased, but microbubbles with multi-core structure were also obtained as shown in the confocal image (FIG. 3B, right image). Increasing the PVA solution volume to 2 ml, resulted in most microbubbles having a single-core structure as shown in the confocal image (FIG. 3C, right image). The SEM images presented microbubbles with surface having bumps and dents due to the single core and shell structure (FIG. 3B, left image for the 1:10 ratio; FIG. 3C, left image for the 2:10 ratio). It can be concluded that inner morphology can be controlled by changing the ratio between the inner surfactant solution and the organic phase. Such a volume ratio change can result in fabrication of microbubbles having different structures, ranging from multi-core to single-core morphology.

Increasing the ratio between the volume of the inner aqueous phase and the volume of the organic phase led to increased inner medium viscosity (since the PVA solution was more viscus than the PLGA solution), whereby "breaking" the PVA solution into small emulsion droplets by sonication became more difficult and, as a result, larger PVA emulsion droplets were obtained. When a large droplet was obtained in the first microemulsion, in the step of producing the second microemulsion, a thin layer of polymer (PLGA) may have wrapped this large drop of PVA solution to create a microbubble having a single core structure. When small droplets were obtained in the first microemulsion, in the process of producing the second microemulsion, the polymer layer may have wrapped few small droplets together and, as a result, a synthetic microbubble having a multi-core structure was obtained.

(iii) the Effects of Surfactant Molecular Weight and Concentration in $W_1$

The minimum surfactant (PVA) concentration required for obtaining microbubbles having a single core and a thin shell structure was evaluated using two stock aqueous solutions of PVA, each comprising PVA having a certain range of molecular weights: 85-124 KDa, herein designate "high Mw PVA" and 31-50 KDa, herein designated "low Mw PVA". Form these two stock solutions, solutions comprising different PVA concentrations were prepared, as described in Materials and Methods, and PVA concentration and/or molecular weight effects on microbubbles morphology and size was assessed.

First, microbubbles were synthesized by the modified double emulsion process as described in Example 1 above, using six different concentrations of high Mw PVA solution in the inner phase: 0% w/v, 0.1% w/v, 0.5% w/v, 1.0% w/v, 2.0% w/v and 5.0% w/v, and high Mw PVA solution as the external phase ($W_2$; PVA concentration 5% w/v). The $W_1$/O volume ratio was 3:10 (Synthesis #3 in Table 2). The microbubbles thus fabricated were analyzed by confocal microscope in order to examine the effect of high Mw PVA solution concentration on the microbubbles inner structure. The results are shown in FIGS. 4A-4F.

Figure 4A:
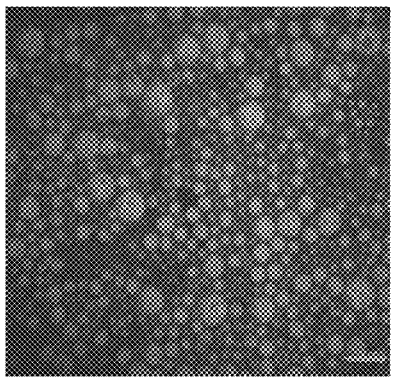
FIGS. 4A-4F are confocal images of exemplary microbubbles synthesized by a modified double emulsion process, wherein the inner aqueous phase ($W_1$) was a high Mw PVA (85-124 KDa) solution having a PVA concentration of: 0 (FIG. 4A), 0.1% w/v (FIG. 4B), 0.5% w/v (FIG. 4C), 1.0% w/v (FIG. 4D), 2.0% w/v (FIG. 4E) or 5.0% w/v (FIG. 4F). High Mw PVA solution in a concentration of 5% w/v was used as the external phase ($W_2$), and $W_1$/O volume ratio was 3:10. Scale bar=10 μm.
Figure 4B:
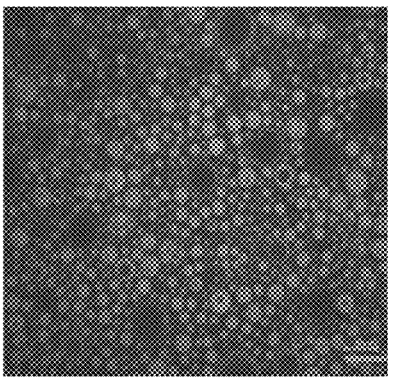
Figure 4C:
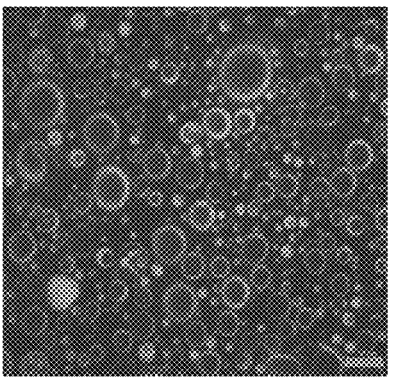
Figure 4D:
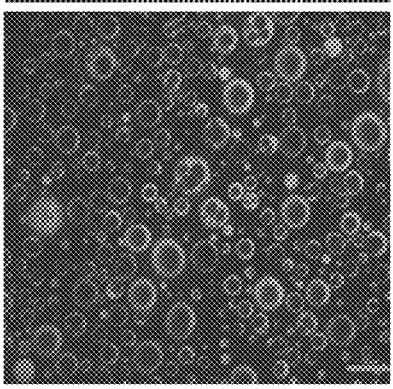
Figure 4E:
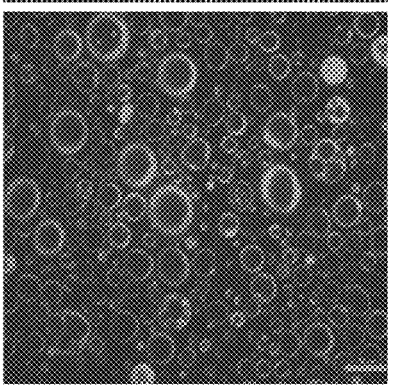
Figure 4F:
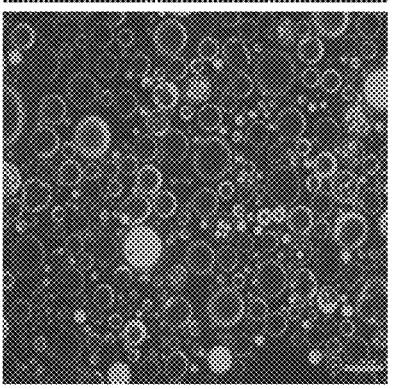

The confocal images revealed that at a concentration of 0.1% w/v high Mw PVA solution (FIG. 4B) and below (FIG. 4A), the amount of PVA in the inner phase was too low to afford stabilized inner phase. Most of the microbubbles obtained were either not hollow, having inner morphology of several small cavities, or having no cavities at all. When a 0.5% w/v high Mw PVA solution was used as inner phase, microbubbles were fabricated presenting a single-core and shell structure (FIG. 4C). Above this concentration, no significant difference in the inner structure of the fabricated microbubbles could be observed.

Next, microbubbles were synthesized by the modified double emulsion process using six different concentrations of low Mw PVA solution (31-50 KDa) in the inner phase: 0% w/v, 0.1% w/v, 0.5% w/v, 1.0% w/v, 2.0% w/v and 5.0% w/v, and low Mw PVA solution as the external phase ($W_2$; PVA concentration 8% w/v). The $W_1$/O volume ratio was 3:10 (Synthesis #4 in Table 2). The microbubbles thus fabricated were analyzed by confocal microscope in order to examine the effect of low Mw PVA solution concentration on the microbubbles inner structure. The results are shown in FIGS. 5A-5F.

Figure 5A:
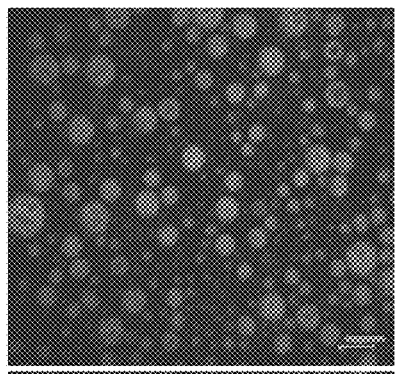
FIGS. 5A-5F are confocal images of exemplary microbubbles synthesized by a modified double emulsion process, wherein the inner aqueous phase ($W_1$) was a low Mw PVA (31-50 KDa) solution having a PVA concentration of: 0 (FIG. 5A), 0.1% w/v (FIG. 5B), 0.5% w/v (FIG. 5C), 1.0% w/v (FIG. 5D), 2.0% w/v (FIG. 5E) of 5.0% w/v (FIG. 5F). Low Mw PVA solution in a concentration of 8% w/v was used as the external phase ($W_2$), and $W_1$/O volume ratio was 3:10. Scale bar=10 μm.
Figure 5B:
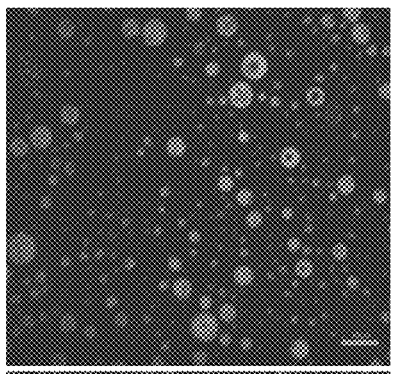
Figure 5C:
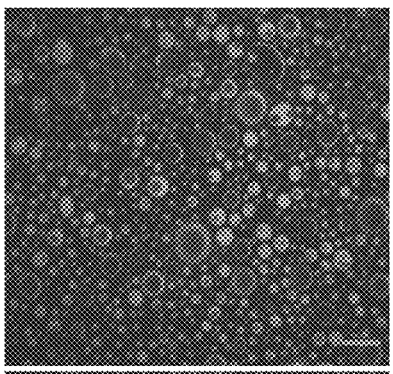
Figure 5D:
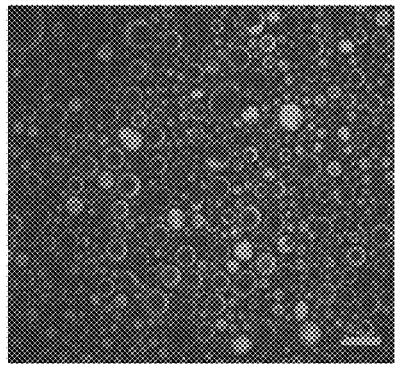
Figure 5E:
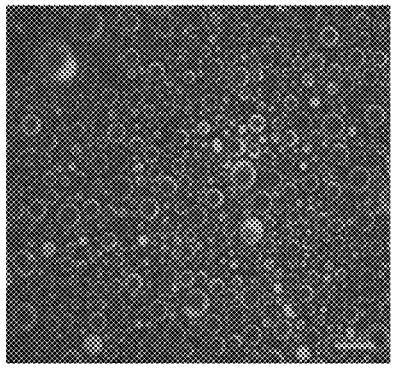
Figure 5F:
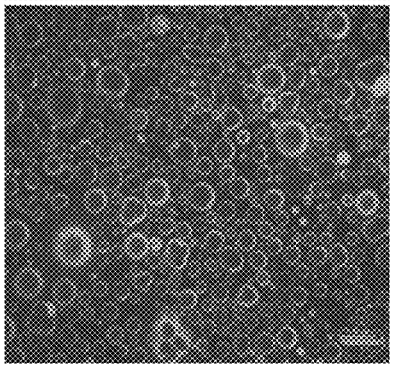

The confocal images revealed that in a solution of low Mw PVA at concentration of 0.1% w/v (FIG. 5B) and below (FIG. 5A), the amount of PVA in the inner phase was too low to afford stabilization of the inner phase. Therefore, most of the obtained particles were not hollow. Microbubbles with a single core structure began to form at low Mw PVA solution concentration of 0.5% w/v, but it can be seen that most of them still have inner morphology of several small cavities or no cavities at all (FIG. 5C). At a concentration of 1.0% w/v (FIG. 5D), most of the fabricated microbubbles presented an inner structure of a single core. Above this concentration, no significant difference in the inner phase structure of fabricated microbubbles was observed.

Without wishing to be bound by theory, it is assumed that the differences in inner structure between synthetic microbubbles produced with low Mw PVA solution as the inner phase and microbubbles produced with high Mw PVA solution as the inner phase, result from difference at steric stabilization provided by the two types of inner phase solutions. The main activity of PVA as an emulsion stabilizing agent is by conferring steric stabilization. Tus, the longer the polymer chain is, the greater the steric disturbance, therefore less leakage of fluid occurs from the inner to the external phase.

(iv) the Effects of Surfactant Molecular Weight and Concentration in $W_2$

Addition of a stabilizing agent (i.e., surfactant) such as PVA to the external phase is essential for stabilizing the second microemulsion and for preventing microbubbles coalescence. The effect of PVA concentration in the external phase on the microbubbles size and morphology was assessed for different molecular weights of PVA.

Microbubbles were synthesized using four different concentrations of high Mw PVA solutions as the external phases: 0.5% w/v, 1.0% w/v, 3.0% w/v and 5.0% w/v (Synthesis #5 in Table 2), and four different concentrations of low Mw PVA solution as the external phases: 1% w/v, 3.0% w/v, 5.0% w/v and 8.0% w/v (Synthesis #6 in Table 2). PVA concentration in the inner phase was 5% w/v and the $W_1$/O volume ratio was 3:10. The synthetic microbubbles obtained were analyzed by confocal microscope and image stream (flow cytometry) in order to characterize their inner structure and size distribution, respectively. The results are shown in FIGS. 6A-6D and FIGS. 7A-7D.

Figure 6A:
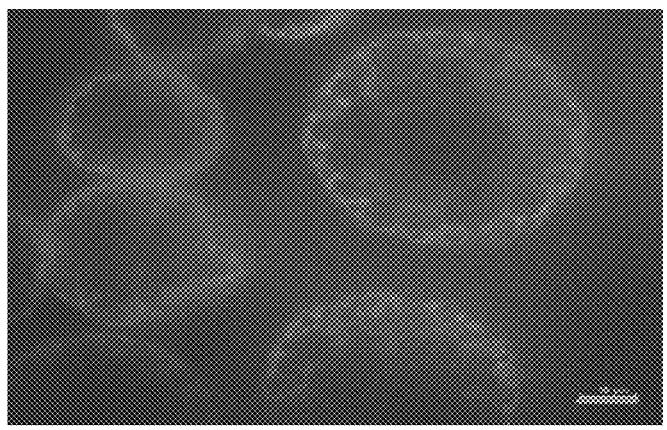
FIGS. 6A-6D are confocal images of exemplary microbubbles synthesized by a modified double emulsion process, wherein the outer aqueous phase ($W_2$) was a high Mw PVA (85-124 KDa) solution having a PVA concentration of: 0.5% w/v (FIG. 6A), 1.0% w/v (FIG. 6B) 3.0% w/v (FIG. 6C) or 5.0% w/v (FIG. 6D). Scale bar=10 μm.
Figure 6B:
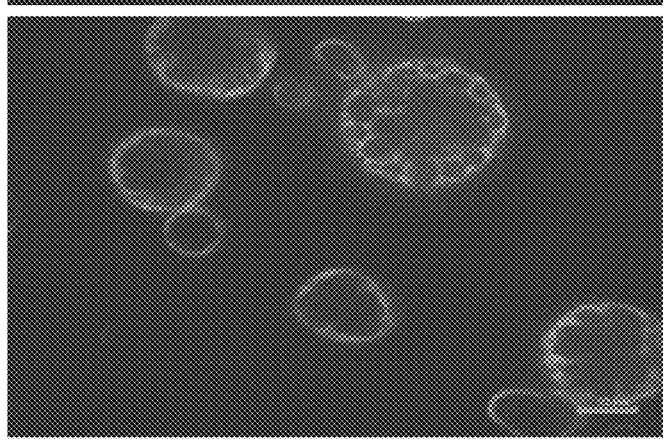
Figure 6C:
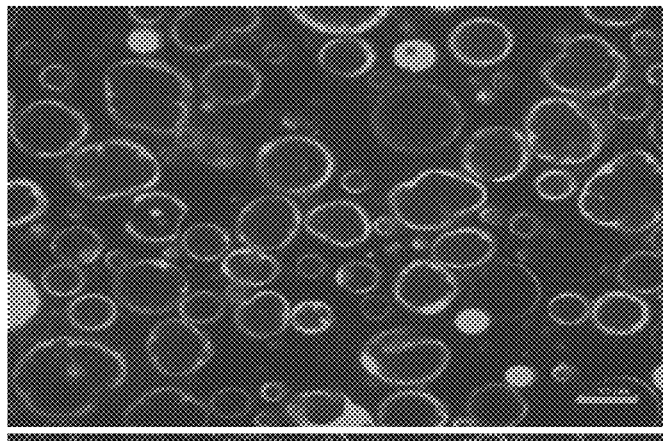
Figure 6D:
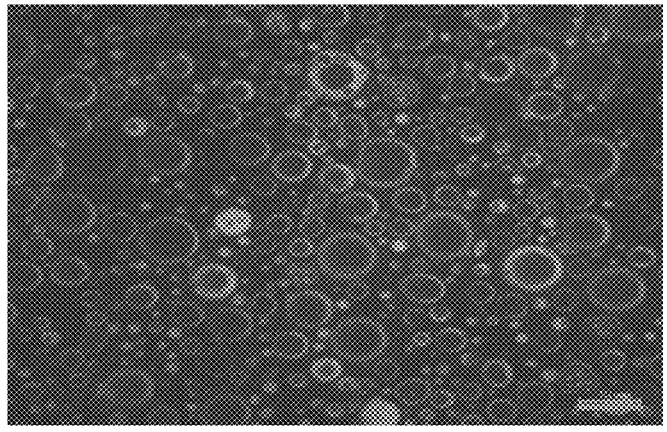

As can be seen in FIGS. 6A and 6B, in low concentrations solutions (0.5% w/v and 1.0% w/v, respectively) serving as outer phase, the amount of high Mw PVA was not sufficient to prevent droplets from coalescence, therefore part of the microbubbles presented a honeycomb structure. When 3% w/v high Mw PVA solution was used, single-core microbubbles were starting to form, but still, a coalescence of microemulsion droplets occurred during the synthesis process, resulting in microbubbles with a honeycomb structure (FIG. 6C). Increasing PVA concentration to 5% w/v prevented droplets coalescence and afforded single-core microbubbles formation (FIG. 6D). Image stream analysis performed indicated that an increase in PVA concentration resulted in a decreased microbubbles size distribution, and a reduction in the percentage of microbubbles with a diameter greater than 10 μm (results not shown).

Figure 7A:
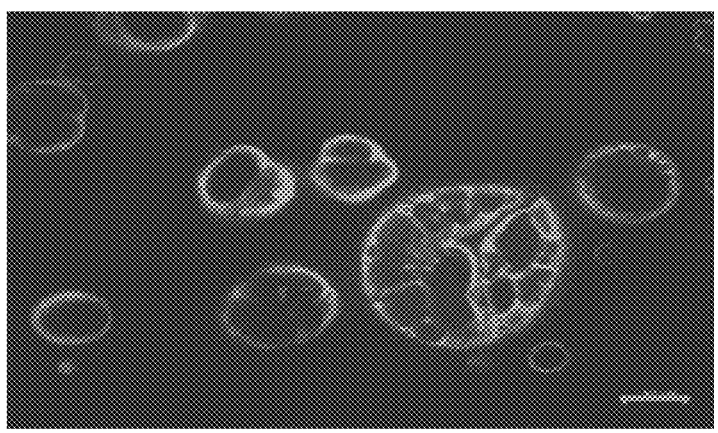
FIGS. 7A-7D are confocal images of exemplary microbubbles synthesized by a modified double emulsion process, wherein the outer aqueous phase ($W_2$) was a low Mw PVA (85-124 KDa) solution having a PVA concentration of: 1.0% w/v (FIG. 7A), 3.0% w/v (FIG. 7B) 5.0% w/v (FIG. 7C) or 8.0% w/v (FIG. 7D). Scale bar=10 μm.
Figure 7B:
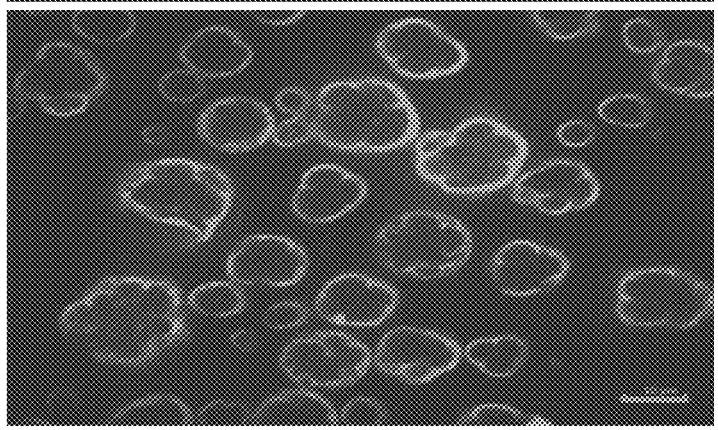
Figure 7C:
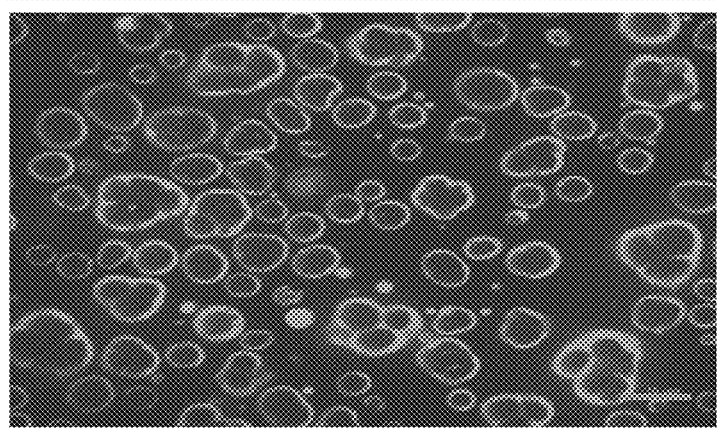
Figure 7D:
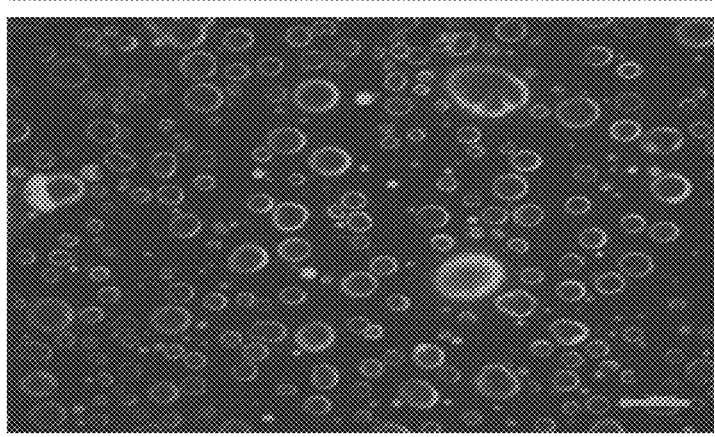

Corresponding results were obtained for microbubbles synthesized with various low Mw PVA solutions as $W_2$. Thus, at concentrations of 1.0% w/v and 3.0% w/v low Mw PVA solutions, the amount of PVA was not sufficient to prevent droplets form coalescence. Several microbubbles presented a honeycomb structure as can be seen in the confocal images (FIGS. 7A and 7B, 1.0% and 3% w/v PVA solution, respectively). When 5.0% w/v low Mw PVA solution was used, microbubbles presenting single-core inner structure started to form, but there was still a coalescence of emulsion droplets (FIG. 7C). At a concentration of 8.0% w/v, most of the microbubbles produced had a single-core inner structure (FIG. 7D).

Based on size distribution analysis it can be concluded that an increase in PVA concentration, whether high Mw PVA or low Mw PVA, led to a decrease in microbubbles size distribution and to a reduction in the percentage of microbubbles with a diameter greater than 10 μm (results not shown). Increasing the PVA concentration provided better stabilization of the microemulsion droplets, as more PVA molecules adsorbed in the interface between the organic phase and the external aqueous phase. An improved protection of the droplets from coalescence was thus obtained, leading to smaller emulsion droplets and a reduction in microbubbles size. However, when the PVA concentration was further increased, at certain point the viscosity of the solution increased to such an extent that it was difficult to form a microemulsion by vortexing (results not shown).

Example 3

The Effect of Gas Type Encased in the Microbubbles on Cavitation Activity

The effect of the type of gas encased in the synthetic microbubbles core on their cavitation activity was evaluated for three different gases: air, $SF_6$, and $C_3F_8$. In order to assess whether there is a change in cavitation activity during circulation of the microbubbles in the system, for example, due to gas leakage into the liquid environment, or microbubbles breakage due to shear stresses, two tests were carried out. In the first test, initiation of sonication and the corresponding cavitation measurements were carried out immediately following microbubbles injection into the system (number of measurement (n)=5 for $SF_6$ core, n=5 for air core and n=7 for $C_3F_8$ core).

In the second test, microbubbles were allowed to circulate in the cavitation measurement system for 10 min before starting sonication and cavitation measurement (n=4 for $SF_6$ core, n=4 for air core and n=5 for $C_3F_8$ core). It is noted that in both tests, during sonication and cavitation measurements, the microbubbles were continuously circulated in the system.

The microbubbles used in all tests were synthesized with 5% high Mw PVA serving as both the inner and external phases. These microbubbles have been shown to have a single core and shell structure (see Example 2 above and FIG. 4F). About $6 \times 10^7$ microbubbles were injected into the system. The acoustic pressure amplitude was set up to 499 KPa. The calculated CD for MBs containing different gases in their core are presented in FIG. 9.

Figure 9:
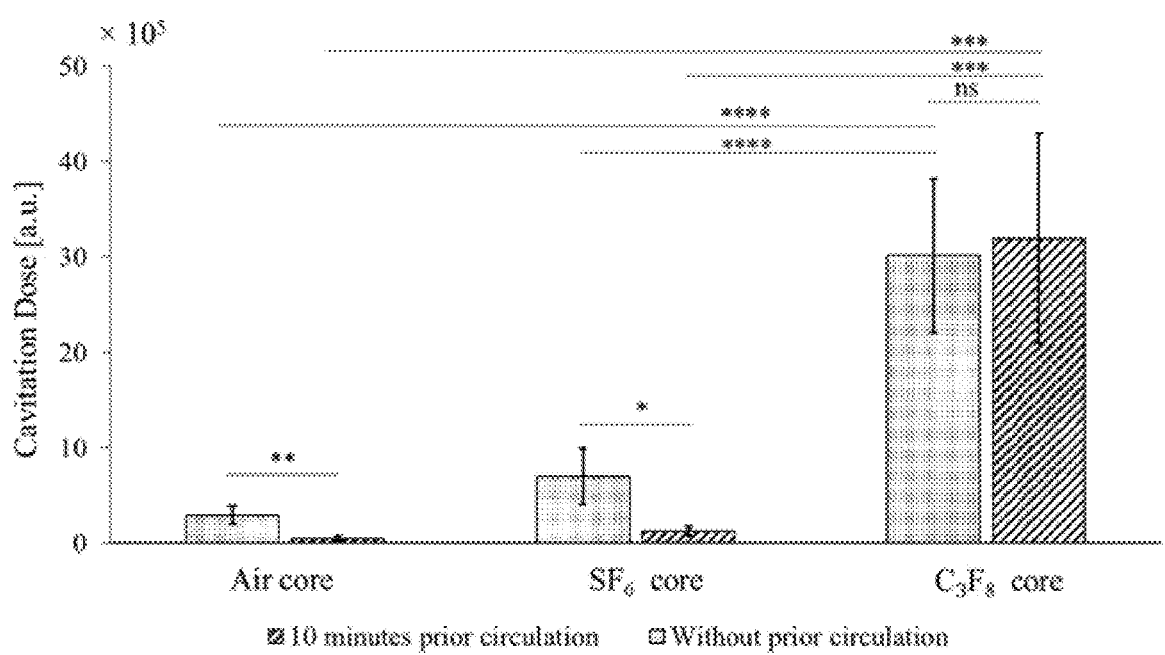
FIG. 9 is a bar graph showing the effect of the type of gas encased by exemplary microbubbles, and timing of cavitation activity measurement, on the calculated cavitation dose (CD). Single-core microbubbles filled with different gases were measure for cavitation activity either immediately following microbubbles injection into the cavitation measurement system, or 10 min later. ns: $p>0.05$; $*p<0.05$, $p<0.01$, $*p<0.001$ and $****p<0.0001$.

As shown in FIG. 9, for both experimental setups the average CD obtained from activity of microbubbles filled with $C_3F_8$ gas was the highest, and the CD increased as a function of the gas entrapped as follows: air <$SF_6$<$C_3F_8$. These results are in agreement with the different solubilities of the various gasses in water, namely, the lower the solubility of a gas in water is, the higher cavitation activity it generates. The gas $C_3F_8$ has higher Mw, lower Ostwald coefficient, and lower diffusion coefficient compared to air and $SF_6$ and, therefore, its diffusion across the polymer shell was slow, while the circulation time and stability of microbubbles encasing this gas were increased. Indeed, microbubbles containing $C_3F_8$ were not affected by the prior 10 min circulation in the system, and the average CD calculated for circulating microbubbles was similar to the CD calculated for microbubbles that did not circulate in the measurement system before cavitation activity was measure. Microbubbles containing air or $SF_6$ demonstrated a significant decrease in the CD after 10 min of circulation, and this decrease is attributed to leakage of gas to the external liquid environment. Involvement of shear forces damage to the microbubbles polymeric shell due to circulation is ruled out, since no decrease in the activity of the microbubbles containing $C_3F_8$ was observed.

Example 4

The Effect of Inner Core Structure on Microbubbles Cavitation Activity

Example 2 above discloses that the inner aqueous phase $W_1$ used in the double emulsion process dramatically affects the core structure of the fabricated microbubbles. For example, when water was used as an inner phase, microbubbles with a structure of small internal cores were obtained (multi-core microbubbles), or microbubbles without any core at all. The volume of these cores was small relative to the volume of the polymer matrix in each microbubble. However, when an aqueous solution of a surfactant such as PVA was used as $W_1$, single-core microbubbles were obtained (also termed herein "hollow core microbubbles"). The internal volume of the hollow core microbubbles was larger than the volume of their polymeric shell, as compared to multi-core microbubbles.

In order to assess the effect of inner structure on microbubbles cavitation activity, two different types of microbubbles were tested: (1) hollow core microbubbles filled with $C_3F_8$ gas, synthesized with 5% w/v high Mw PVA solution as the inner phase (n=7); and (2) multi-core microbubbles filled with $C_3F_8$ gas, synthesized with deionized water as the inner phase (number of measurement (n)=5). In addition, cavitation activity of free $C_3F_8$ gas (n=4) was tested to determine whether the cavitation activity measured originated solely from the dispersed microbubbles, or whether cavitation of the free $C_3F_8$ gas in the liquid contributed to the CD, since during sample preparation, the liquid is enriched with gas which is located in the vail headspace.

About $6 \times 10^7$ microbubbles were injected into the system. For the free gas, 350 µl of $C_3F_8$ gas was injected directly into the system. The acoustic pressure amplitude was set up to 499 KPa. The calculated CD for free $C_3F_8$, multi-core microbubbles and hollow core microbubbles is shown in FIG. 10.

Figure 10:
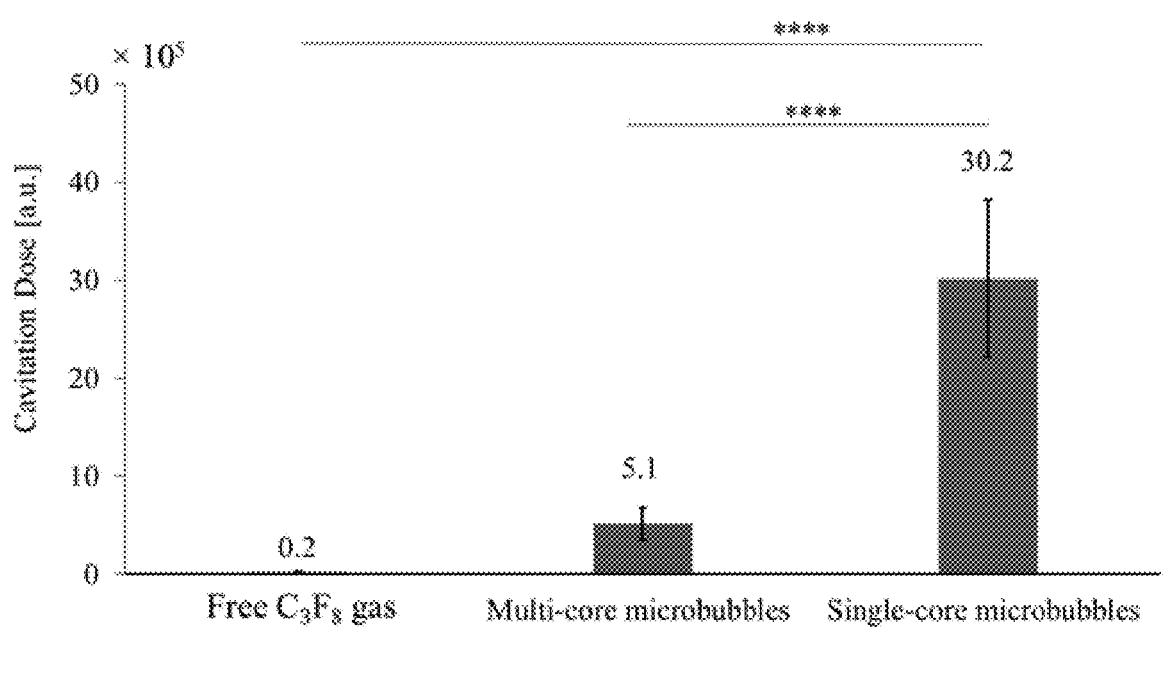
FIG. 10 is a bar graph showing the effect of microbubbles core structure on the calculated cavitation dose (CD). Cavitation activity was measured for: multi-core microbubbles filled with $C_3F_8$ gas, synthesized by the double emulsion process using water as $W_1$, for single, hollow core microbubbles filled with $C_3F_8$ gas, synthesized by the double emulsion process using 5% w/v high Mw PVA solution as $W_1$, and for free $C_3F_8$ gas.

As shown in FIG. 10, the internal morphology of the microbubbles dramatically affected their cavitation activity. Cavitation dose calculated for multi-core microbubbles was substantially lower than CD calculated for single-core (hollow) morphology. It is assumed that due to the internal morphology, the volume of gas captured or encased in the multi-core microbubbles was lower than the volume of gas captured in the hollow microbubbles, therefore, the cavitation activity of the multi-core microbubbles was lower. Furthermore, multi-core microbubbles have high stiffness since the polymer volume in these particles is high relative to the volume of the cavities, and higher acoustic pressure was probably needed to crack the polymer wall or cause the MBs to collapse and cavitate.

Finally, as shown in FIG. 10, the cavitation activity of free $C_3F_8$ was very low compared to the activity of hollow microbubbles, indicating that the source of cavitation was the actual cavitation activity of the PLGA microbubbles injected into the system rather than the free $C_3F_8$ gas in the liquid.

Example 5

The Effect of Acoustic Pressure on Microbubbles Cavitation Activity

In order to assess the effect of acoustic pressure amplitude on microbubbles cavitation activity, and identify the inertial cavitation threshold, the cavitation dose of hollow microbubbles filled with $C_3F_8$ gas was measured under acoustic pressures amplitudes increasing from 352 KPa to 499 KPa. Two sets of microbubbles were measured: (1) single-core microbubbles synthesized with 5% w/v high Mw PVA aqueous solution serving as both inner ($W_1$) and external ($W_2$) phases; (2) single-core microbubbles synthesized with 5% w/v low Mw PVA as $W_1$ and 8% w/v low Mw PVA as $W_2$. About $6 \times 10^7$ microbubbles of each set were injected into the in vitro cavitation measurement system, and the CD were measured by passive cavitation detection method as described in Materials and Methods. The results are presented in FIG. 11.

Figure 11:
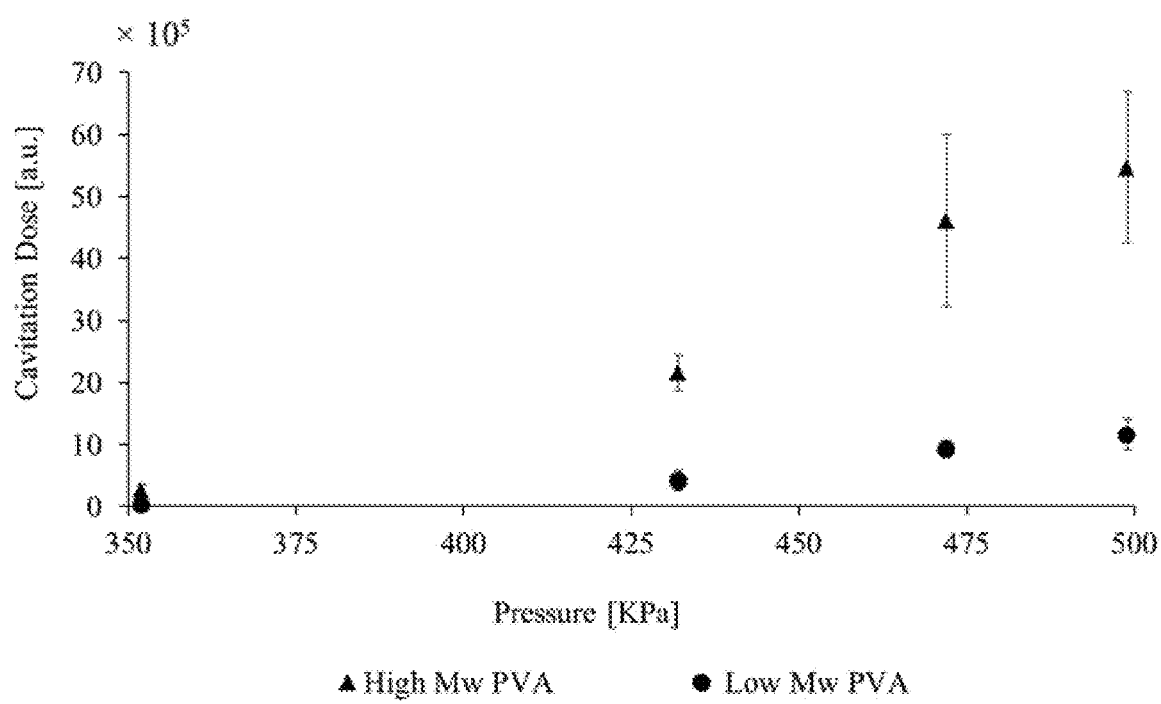
FIG. 11 is a graph showing the calculated cavitation dose (CD) obtained from cavitating microbubbles as a function of acoustic pressure applied. Cavitation dose was evaluated for two different types of single-core microbubbles filled with $C_3F_8$ gas: (1) microbubbles synthesized with 5% w/v high Mw PVA in the inner and external phases; and (2) microbubbles synthesized with 5% w/v low Mw PVA in the inner phase and 8% w/v low Mw PVA in the external phase.

As shown in FIG. 11, for acoustic pressures of 352 KPa, the CD was low for both sets, and no significant activity was observed. At 432 KPa, there was a significant increase in cavitation activity of set 1 (microbubbles synthesized with high Mw PVA in both $W_1$ and $W_2$), followed by further significant increases at about 470 KPa and 499 KPa. The increase in pressure from 352 KPa to 432 KPa probably led to a collapse of some of the microbubbles, accounting for the sharp increase in cavitation activity. The subsequent increase in cavitation activity following increasing the acoustic pressure to 470 KPa and then to 499 KPa was probably related to the non-uniformly structured microbubbles. The plurality of microbubbles comprised microbubbles of varying shell thickness and, therefore, different inertial cavitation thresholds. Thus, microbubbles that collapsed at the highest pressure were those with thicker shells.

For microbubbles of set (2) that were synthesized with low Mw PVA in $W_1$ and $W_2$, the increase in CD was moderate, and in each of the pressures examined the CD of these microbubbles was smaller compared to the CD of microbubbles of set (1). Microbubbles of set (1) were a little larger than microbubbles of set (2) (results not shown). It is known that microbubbles of different sizes produce different cavitation activities, when larger hollow microbubbles that entrap larger gas volume will have higher cavitation activity compared to smaller microbubbles that encase smaller volume of gas.

Microbubbles with different cavitation threshold can be used for different medical treatments. In medical applications where sharp response curve and production of significant CD in relatively low acoustic pressures are needed, microbubbles synthesized with high Mw PVA can be a suitable solution, whereas in cases where a moderate response curve is required, microbubbles synthesized with low Mw PVA will provide a good solution.

Example 6

In Vivo Safety Study

An amount of $1 \times 10^9$ PLGA microbubbles dispersed in 5 ml saline were I.V. injected to a female pig through the ear vein followed by saline flush. A hundred and twenty minutes (120 min) after the first injection, an additional amount of $2.6 \times 10^9$ PLGA microbubbles (dispersed in 8 ml saline) were injected using the same protocol. Anesthesia, endotracheal intubation and continuous monitoring of the pig's vital signs (i.e., body temperature, electrocardiography (ECG), and oxygen saturation ($SPO_2$) were conducted as described in Materials and Methods. After 160 min, the anesthesia and intubation were stopped. The pig's vital signs as measured throughout the procedure are presented in FIG. 12.

Figure 12:
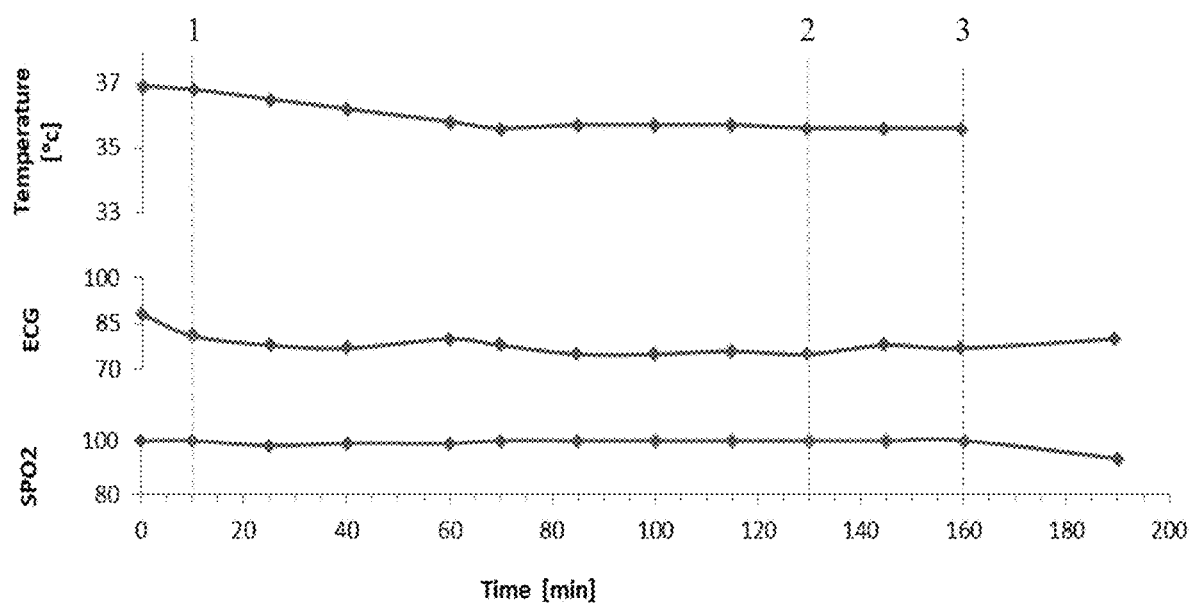
FIG. 12 is a series of three graphs presenting the vital signs of a female pig over time following I.V. injection of PLGA microbubbles: (1) represents the time point of $1 \times 10^9$ microbubbles injection; (2) represents the time point of $2.6 \times 10^9$ microbubbles injection; and (3) is end of anesthesia and intubation.

As shown in FIG. 12, intravenously injected microbubbles did not cause any adverse effects in the treated animal. The behavior of the animal was further monitored on the day after injections. The pig was fully recovered, and showed signs of normal behavior (e.g., eating, drinking, standing).

Accordingly, in can be concluded that the disclosed microbubbles may be considered as safe to use.

Example 7

Opening of Blood-Brain Barrier (BBB) by Microbubbles Acoustic Cavitation

After demonstrating that disclosed microbubbles are safe for in vivo use, their cavitation activity within a living body was assessed.
(i) Animal Preparation
Pig skull is closer to the brain itself and, therefore, may lead to aberrations in the ultrasound beam. Thus, the animal needed to undergo a wide craniotomy procedure (6 cm×6 cm) before being subjected to MR-guided focused ultrasound. The animal was sedated by I.M. injection of ketamine (10 mg/Kg) and xylazine (2 mg/Kg).

(ii) Experimental Procedure
An amount of $1 \times 10^9$ lyophilized PLGA microbubbles dispersed in 5 ml saline were I.V. injected to the animal (bolus injection through the leg vein), followed by saline flush. Immediately after injection, sonication was performed, using the Exablate Neuro™ (InSightec Ltd, Israel) platform, as described in Materials and Methods. Thirty-six (36) sub-spots were sonicated by pulsed US waves that were generated by 690 elements with acoustic power of 2 W and frequency of 230 KHz. The first subspot was sonicated for 5 ms, and 23 ms after the first sonication ended, the adjacent subpoint was sonicated for 5 ms and so on for all 36 subspots. After all subspots were sonicated, the same sonication pattern was repeated for a total measurement time of 200 sec, namely, each sub-spot was sonicated about 200 times. The microbubbles cavitation dose (CD) was measured over time by the PCD method using an apparatus manufactured by Insightec Ltd.

Following the procedure, MultiHance®-GD-based MRI contrast agent was injected to the animal bloodstream, and the animal undergone post-MRI in order to assess the treatment success. T2* weighted images were used to assess tissue damage and GD enhanced T1 weighted imaging provided information on BBB permeability. The animal's vital signs were continuously monitored during the entire experiment, and it was kept anesthetized (as described in Material and Methods) and ventilated by an MR compatible ventilator.

Figure 13:
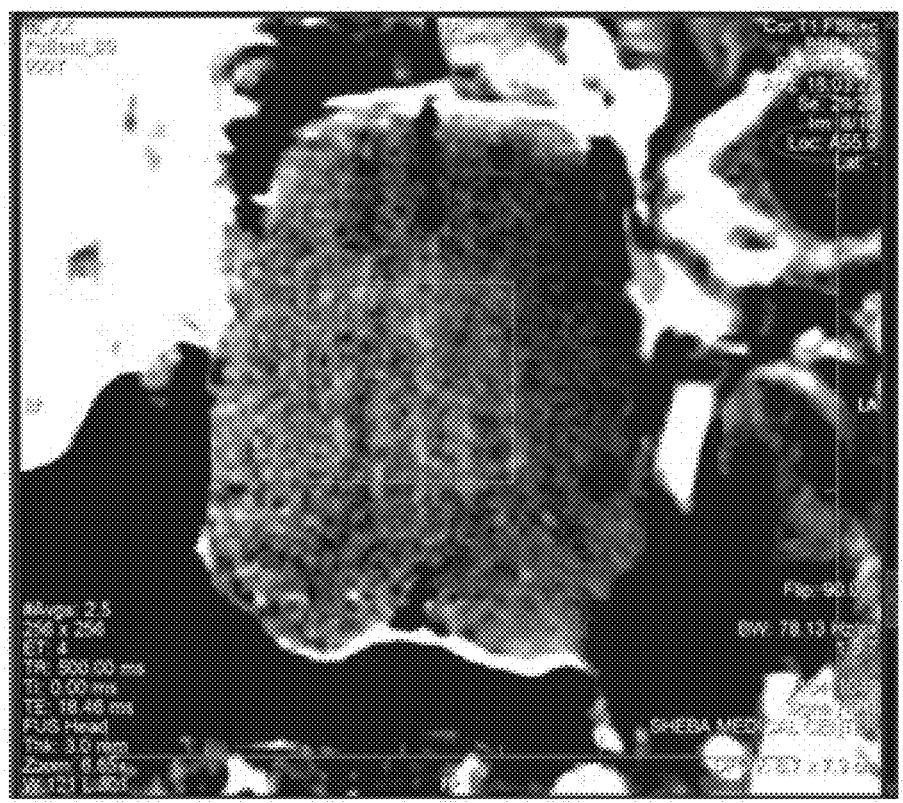
FIG. 13 is a Gd-enhanced T1 weighted MR image of a female pig brain following I.V. injection of PLGA microbubbles and MRI-guided focused ultrasound (MRgFUS) procedure for opening of the blood-brain barrier.
Figure 15:
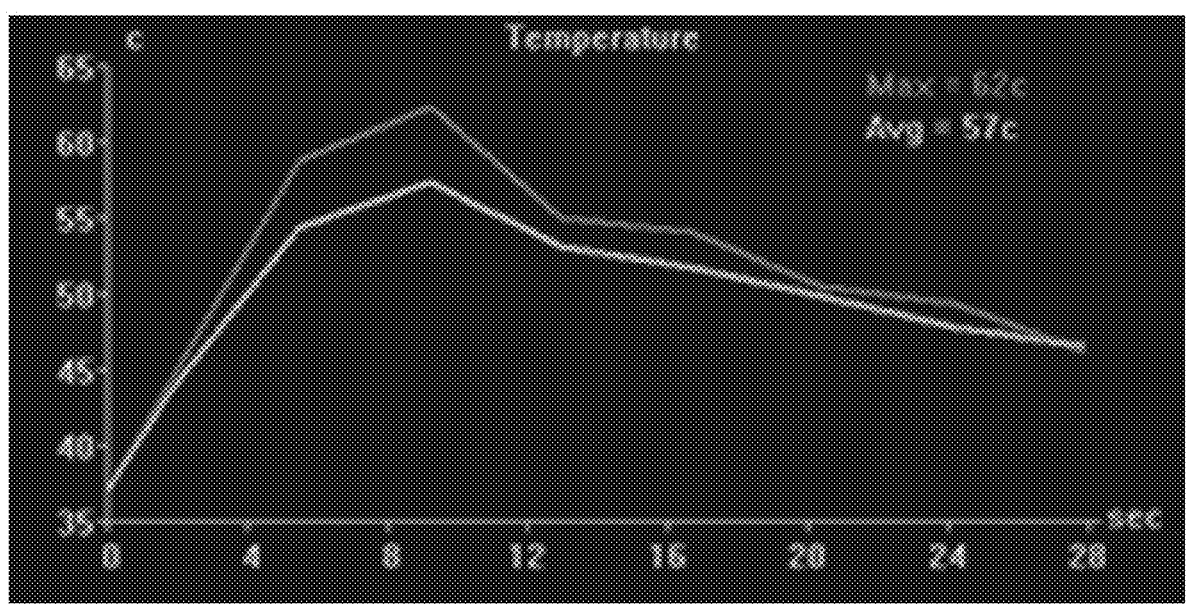
FIG. 15 is a graph showing the temperature profile as measured in the brain of a female domestic pig injected with microbubbles filled with $C_3F_8$ gas, after local (brain) sonication

The biological effect of the cavitating microbubbles in the pig's brain is shown in FIG. 13 (a T1 weighted MR image). The microbubbles cavitation activity led to BBB disruption and permeability enhancement, manifested by penetration of the MRI contrast agent into the brain. The bright areas indicate the presence of Gd, which without the disruption of the BBB cannot be found in these regions. T2* weighted MR images did not present any irreversible damage to brain tissue (results not shown).

Furthermore, the ability of the microbubbles to sustain or tolerate passage through the bloodstream and organs, until being subjected to an acoustic pressure at the target site, was demonstrated by their impressive and significant in vivo cavitation activity.

Example 8

Ablation by Microbubbles Acoustic Cavitation

The ability of PLGA microbubbles of the present disclosure to serve as ablation means was assessed. Ablation studies were performed on female domestic pigs utilizing the Exablate Neuro™ (InSightec Ltd, Israel) neurosurgery platform as described in Material and Methods. Microbubbles were administered to the animals in two different routes: (i) infusion; and (ii) bolus injection. Pigs were anesthetized, and their vital signs were continuously monitored during the entire experiments, as described in Materials and Methods.

For administration by infusion, $1.2 \times 10^{10}$ PLGA microbubbles were inserted into 100 ml infusion bag and administered to the animals as a continuous infusion. Local sonication (in the animal's brain) was performed at a frequency of 650 KHz and power of 140 W. Following the procedure, the animal undergone post-treatment MRI scanning in order to assess the treatment success. The treatment results are presented in FIGS. 14A-14C.

As shown in FIG. 14A, a significant temperature increase was obtained following sonication ($\Delta T=16°$ C.), which generated pure thermal lesion as manifested in T2 weighted images taken before (FIG. 14B) and after (FIG. 14C) the procedure. No evidence of micro bleeding was observed in T2* images of the brain taken by a post-ablation MRI scanning.

One and a half hour after microbubbles infusion stopped, sonication was performed at 140 W power level in order to evaluate the temperature increase in the absence of microbubbles. A significantly smaller temperature increase was obtained ($\Delta T=9°$ C.), which can be attributed to the cavitation activity of traces amounts of microbubbles (results not shown).

Administration by bolus injection was performed by injecting $3\times10^9$ PLGA microbubbles to the leg vain were of a female domestic pig, followed by saline flush. After injection, local sonication was performed in the fig's brain at a frequency of 650 KHz and power of 150 W. The temperature increase was measured and is presented in FIG. 13.

As shown in FIG. 13, a significant temperature increase ($\Delta T=20°$ C.) was obtained due to microbubbles cavitation activity in the brain. These results clearly indicate that the microbubbles described herein not only provide enhanced cavitation activity which makes them most suitable for noninvasive thermal surgery, but are also stable, durable and suitable for systemic administration such as by infusion or injection.

Known microbubbles comprising PLGA shell are used as contrast agents in various imaging applications. They are rigid and designed for a long duration (i.e., up to few hours or until they are secreted or cleared by the body. These microbubbles are not expected to break and produce acoustic cavitation while circulating in blood stream. The in vivo experiments disclosed herein showed, unexpectedly, that PLGA microbubbles fabricated by the double emulsion methods as described herein are cavitating and are thus suitable for various therapeutic procedures and applications that make use of the cavitation phenomena, such as, but not limited to, ablation applications and enhancement of drug delivery by means of increasing permeability of membranes and tissue barriers.

The invention claimed is:

1. A plurality of microbubbles comprising a polymeric shell encapsulating a gas, wherein at least a portion of the microbubbles are hollow, single-core microbubbles of 10 μm diameter or less, comprising a non-porous poly-lactic-co-glycolic acid copolymer (PLGA) shell of a predetermined lactic acid:glycolic acid molar ratio, and thickness of from about 100 nm to about 800 nm, and wherein the plurality of microbubbles are produced by a double emulsion solvent evaporation method comprising the steps of:
(i) obtaining an organic phase (O) comprising the PLGA copolymer in an amount of from about 10 mg/ml to about 100 mg/ml, and an organic solvent;
(ii) obtaining a first aqueous phase ($W_1$) comprising a first surfactant in an amount in a range of from about 0.1% w/v to about 15.0% w/v;
(iii) obtaining a second aqueous phase ($W_2$) comprising a second surfactant in an amount in a range of from about 2% w/v to about 15% w/v;
(iv) combining the organic phase and the first aqueous phase under emulsification conditions to obtain a first microemulsion $W_1/O$, having a $W_1:O$ volume ratio in the range of from about 0.5:10.0 to about 5.0:10.0;
(v) combining a portion of the first microemulsion $W_1/O$ with the second aqueous phase under emulsification conditions to obtain a second microemulsion $W_1/O/W_2$;
(vi) evaporating the organic solvent; and
(vii) harvesting the microbubbles, washing and, optionally, subjecting them to lyophilization.

2. The plurality of microbubbles of claim 1, wherein at least one of the first or second surfactant is: partially hydrolyzed polyvinyl alcohol (PVA), a polysorbate, sodium dodecyl sulphate (SDS), cetyltrimethyl ammonium bromide (CTAB), Poloxamer 188, polyethylene glycol (PEG), octoxynol-9, or any combination thereof.

3. The plurality of microbubbles of claim 1, wherein the first and second surfactant are the same.

4. The plurality of microbubbles of claim 1, wherein the first and second surfactant are different.

5. The plurality of microbubbles of claim 2, wherein at least one of the first or second surfactant is PVA.

6. The plurality of microbubbles of claim 5, wherein both the first and second surfactant are PVA.

7. The plurality of microbubbles of claim 1, characterized by at least one of:
(i) the encapsulated gas is at least one of air, sulfur hexafluoride ($SF_6$), perfluoropropane ($C_3F_8$) or perfluorobutane ($C_4F_{10}$);
(ii) the organic solvent is at least one of ethyl acetate or dichloromethane;
(iii) the predetermined lactic acid:glycolic acid molar ratio is 50:50; or
(iv) at least a portion of the plurality of microbubbles comprises stable and durable microbubbles having a prolonged circulation time in a biological system selected from the groups consisting of an organ, a tissue, or a portion thereof in the body of a subject.

8. The plurality of microbubbles of claim 1, producing an acoustic cavitation upon stimulation thereof, wherein the acoustic cavitation produced is determined by the microbubbles production process, and the acoustic cavitation is an inertial cavitation or a stable cavitation.

9. The plurality of microbubbles of claim 1, wherein at least a portion of the microbubbles are of 2 to 5 μm diameter.

10. A pharmaceutical composition comprising a plurality of microbubbles as defined in claim 1, and a pharmaceutically acceptable excipient.

11. A kit comprising: (a) a plurality of microbubbles as defined in claim 1, or a pharmaceutical composition comprising same; and, optionally, (b) written instructions.

12. A plurality of microbubbles comprising a polymeric shell encapsulating a gas, wherein at least a portion of the microbubbles comprise a poly-lactic-co-glycolic acid copolymer (PLGA) shell of a predetermined lactic acid:glycolic acid ratio, the plurality of microbubbles are produced by a double emulsion process comprising the steps of:
(i) obtaining an organic phase (O) comprising the PLGA copolymer and an organic solvent;
(ii) obtaining a first aqueous phase ($W_1$) comprising partially hydrolyzed polyvinyl alcohol (PVA) in an amount of from about 0.1% w/v to about 15.0% w/v and molecular weight of from about 10 kDa to about 200 kDa;
(iii) obtaining a second aqueous phase ($W_2$) comprising partially hydrolyzed PVA in an amount of from about 0.5% w/v to about 15.0% w/v and molecular weight of from about 10 kDa to about 200 kDa;
(iv) combining the organic phase and the first aqueous phase under emulsification conditions to obtain a first microemulsion $W_1/O$, having a $W_1:O$ volume ratio of from about 0.5:10.0 to about 5.0:10.0;

(v) combining a portion of the first microemulsion $W_1/O$ with the second aqueous phase under emulsification conditions to obtain a second microemulsion $W_1/O/W_2$;

(vi) evaporating the organic solvent; and (vii) harvesting the microbubbles, washing and, optionally, subjecting them to lyophilization.

13. The plurality of microbubbles of claim 12, characterized by at least one of:

(i) the predetermined lactic acid:glycolic acid molar ratio is 50:50;

(ii) the amount of PVA in $W_1$ is from about 0.5% w/v to about 6.0% w/v;

(iii) the amount of PVA in $W_2$ is from about 2.5% w/v to about 10.0% w/v;

(iv) the molecular weight of PVA is in a range of from about 28 kDa to about 55 kDa or from about 80 kDa to about 130 kDa; or (v) 99.8% of the microbubbles have a diameter of from about 1 µm to about 10 µm.

14. The plurality of microbubbles of claim 12, wherein the $W_1:O$ volume ratio is from about 0.5:10.0 to about 2.0:10.0, and at least a portion of the microbubbles are multi-core microbubbles, or $W_1:O$ is from about 2.1:10.0 to about 4.0:100, and at least a portion of the microbubbles are single-core microbubbles.

15. The plurality of microbubbles of claim 14, wherein the PVA in $W_1$ is of molecular weight in the range of from about 80 kDa to about 130 kDa and an amount of 0.5% to about 6% w/v, or PVA is of molecular weight in the range of from about 28 kDa to about 55 kDa and an amount of 1% to about 10% w/v.

16. The plurality of microbubbles of claim 12, characterized by at least one of:

(i) the gas is at least one of air, sulfur hexafluoride ($SF_6$), perfluoropropane ($C_3F_8$) or perfluorobutane ($C_4F_{10}$);

(ii) the organic solvent is at least one of ethyl acetate or dichloromethane;

(iii) at least a portion of the plurality of microbubbles comprises stable and durable microbubbles having a prolonged circulation time in a biological system selected from the groups consisting of an organ, a tissue, or a portion thereof in the body of a subject;

(iv) at least a portion of the microbubbles are of less than 10 µm diameter; or (v) the plurality of microbubbles produces an acoustic cavitation upon stimulation thereof, wherein the acoustic cavitation produced is determined by the microbubbles structure, microbubbles production process or a combination thereof, and the acoustic cavitation is an inertial cavitation or a stable cavitation.

17. The plurality of microbubbles of claim 16, wherein at least a portion of the microbubbles are of 2 to 5 µm diameter.

18. A method for one or more of: (i) increasing the permeability of a membrane, a tissue or a biological barrier in a tissue; and (ii) ablation of a tissue or a portion thereof, in a subject in need thereof, the method comprising the steps of:

(a) administering to the subject an effective amount of a plurality of microbubbles as defined in claim 1; and (b) stimulating the microbubbles in a predetermined desired region in the subject's tissue by the application of a local acoustic pressure to create a localized acoustic cavitation, thereby ablating the tissue or a part thereof or increasing the permeability of the membrane, tissue or biological barrier in the tissue of the subject.

19. The method of claim 18, characterized by at least one of:

(i) increasing the biological barrier permeability for facilitating entry of biologically active compounds into tissues, exit of hazardous compounds from tissues, or both;

(ii) the biological barrier is an inter-tissue barrier selected from the group consisting of blood brain-barrier, blood-retinal barrier or blood testis-barrier, and the tissue is skin;

(iii) the localized acoustic cavitation is an inertial cavitation or a stable cavitation; or (iv) the microbubbles are administrated to a subject by a systemic route, a local route or a combination thereof.

20. The method of claim 18, for treatment of a disease, disorder or condition that may be cured or ameliorated by increasing the permeability of a biological barrier, ablation of a tissue or a part thereof, or both.

21. The method of claim 20, for at least one of: (i) treatment of vascular thrombosis; (ii) ablation of cancerous or non-cancerous solid tumor; (iii) enhancement of transdermal drug delivery; (iv) enhancing uptake of chemical or biological therapy in cells and tissue; or (iv) destruction of adipocytes.

* * * * *